United States Patent
Lordello et al.

(10) Patent No.: US 8,688,948 B2
(45) Date of Patent: Apr. 1, 2014

(54) FLEXIBLE MEMORY CONTROLLER FOR AUTONOMOUS MAPPING OF MEMORY

(75) Inventors: Clovis L. Lordello, Campinas (BR); Jose M. Furtado, Campinas (BR); Reginaldo Hilario Gabarrao, Jaguariuna (BR); Silvio Luiz Lima Nogueira, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 1192 days.

(21) Appl. No.: 12/579,873

(22) Filed: Oct. 15, 2009

(65) Prior Publication Data

US 2011/0093680 A1    Apr. 21, 2011

(51) Int. Cl.
   *G06F 12/00*    (2006.01)
(52) U.S. Cl.
   USPC .......................................... 711/202
(58) Field of Classification Search
   USPC .......................................... 711/202
   See application file for complete search history.

(56) References Cited

U.S. PATENT DOCUMENTS 5,117,350 A * 5/1992 Parrish et al. ...................... 711/1
5,687,343 A * 11/1997 Fecteau et al. ............... 711/202

OTHER PUBLICATIONS

Ewald Von Puttkamer, "A Simple Hardware Buddy System Memory Allocator," IEEE Transactions on Computers, vol. c-24, No. 10, Oct. 1975, pp. 953-957.
Jin-Long Chen et al., "Page-Based Non-Contiguous Dynamic Memory Allocator," 2006, pp. 1-9.

* cited by examiner

*Primary Examiner* — Matthew Bradley

(57) ABSTRACT

A memory controller implements flexible memory mapping for storage of data units in a memory. The memory controller logically partitions the memory into a plurality of blocks or block segments and manages the storage of data units among the plurality of blocks/block segments. The memory controller can operate in one of three modes: a monolithic mode whereby the memory is modeled as a plurality of blocks, whereby each block is treated as a "monolithic" block; a fragmented mode whereby the memory is modeled as a plurality of blocks segments of varying sizes; and a combined mode whereby the memory is initially partitioned into a plurality of equal-sized blocks, and whereby each block can be used as a monolithic block or a fragmented block comprising a plurality of block segments of different sizes, and wherein monolithic blocks can be converted to fragmented blocks and fragmented blocks can be converted back to monolithic blocks.

20 Claims, 16 Drawing Sheets

FLEXIBLE MEMORY CONTROLLER FOR AUTONOMOUS MAPPING OF MEMORY

FIELD OF THE DISCLOSURE

The present disclosure relates to data storage in data processing devices and more particularly to memory controllers for managing data storage.

BACKGROUND

Data processing devices often use static or dynamic memory to store data. Typically, the memory is strictly formatted such that each atomic storage unit of the memory is individually addressable. A data unit, such as a data file, table, or other logical arrangement of data, to be stored to the memory may exceed the size of the atomic storage unit, and thus will require multiple atomic storage units. Moreover, the size of the data unit may be such that the stored data unit spans higher-level inner borders of the memory. To illustrate, a data unit may be stored across multiple sectors or multiple banks of a memory. To facilitate efficient access to a stored data unit, data processing devices implement a software-based memory mapping mechanism whereby a portion of a memory is mapped to store a data unit such that the mapped portion of the memory is referenced using a single identifier, such as a pointer or single memory address. This memory mapping mechanism typically is implemented as a software routine, such as the "malloc" routine implemented by many standard system libraries, that is called by an application or the operating system to allocate storage to a data unit. However, the frequency of write/read/erase cycles often causes such software-based memory mapping techniques to consume significant processing cycles, thereby impeding the overall processing efficiency of the data processing device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
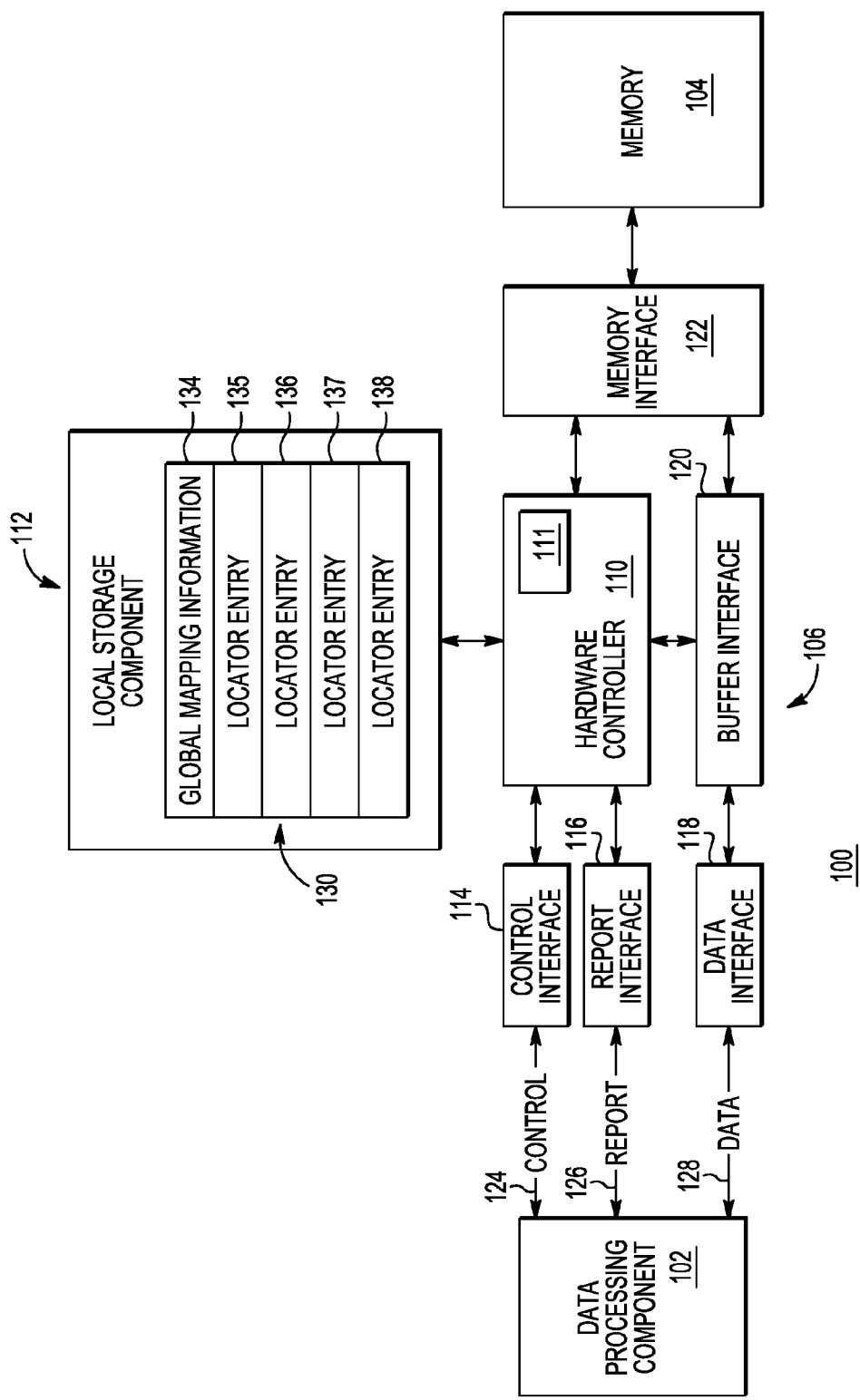
FIG. 1 is a diagram illustrating a data processing device in accordance with at least one embodiment of the present disclosure.

FIGS. 1-16 illustrate example techniques for flexible hardware-based memory mapping for variable-sized data units in a data processing device. The data processing device includes one or more data processing components (e.g., a central processing unit, a graphics processing unit, an analog-to-digital converter, etc.), a memory, and a memory controller to manage the storage of data units (e.g., files, tables, and the like) in the memory for the one or more data processing components. The memory controller includes a hardware controller and a local storage component that stores global mapping information and a locator map table having a plurality of locator entries associated with a plurality of locators. The hardware controller logically partitions the data storage component into a plurality of blocks or block segments and manages the storage of data units among the plurality of blocks/block segments. The hardware controller uses the locator map table to store information regarding which blocks/block segments are mapped to which locators. The data processing components then may use the locator associated with a particular data unit to request the memory controller to read or erase the corresponding data unit from the memory. In one embodiment, the memory controller can operate in one of three modes: (1) a monolithic mode whereby the memory is modeled as a plurality of blocks, whereby each block of the plurality of blocks is treated as a "monolithic" block such that the entire block can be mapped to only one locator at a time (i.e., the monolithic block can only store data from one data unit at a time); (2) a fragmented mode whereby the memory is modeled as a plurality of blocks segments of varying sizes; and (3) a combined mode whereby the memory is first portioned into a plurality of equal blocks, and whereby each block can be used as a monolithic block or a fragmented block comprising a plurality of block segments of different sizes, and wherein monolithic blocks can be converted to fragmented blocks and fragmented blocks can be converted back to monolithic blocks as appropriate. Further, the block segment of a fragmented block can be further fragmented into a plurality of block segments. In one embodiment, the fragmentation of the memory or a block or the further fragmentation of a block segment is performed such that the sizes and arrangements of the blocks of the resulting fragmentation represent a fractal pattern.

The term "memory", as used herein, refers to any of a variety of data storage components, such as random access memory (RAM), flash memory, a cache, an optical storage device, a magnetic disk storage drive, and the like. For ease of illustration, the example techniques of the present disclosure are described in a context wherein an entire memory is partitioned in accordance with one of the three models. However, these same techniques can be applied to a particular portion or subset of a memory in the same manner. Accordingly, reference to the partition or modeling of a memory also refers to the partition or modeling of a portion or subset of the memory allocated for this purpose. The expression "quantum-N," as used herein, refers to the basic measurement unit of the memory partitioning models described herein, such that a block of quantum-N has a size B^N, whereby B is an integer base value selected based on implementation details (e.g., the original size of the memory being partitioned) and N is an integer value referring to the order of the size of the corresponding block or block segment. For ease of discussion, the example techniques of the present application are described in the context of Base-2. The expression "fragmentation" and its variations, as used herein, refer to the process of subdividing a quantum-N block segment into block segments of lower orders (quanta N−1 and lower).

FIG. 1 illustrates a data processing device 100 utilizing hardware-based flexible memory mapping in accordance with at least one embodiment of the present disclosure. The data processing device 100 can include any of a variety of devices that receive, produce, or store data, such as a computer, a server, a cellular phone, a personal digital assistant, a media player, an automotive navigation system, an analog-to-digital converter, and the like. The data processing device 100 includes one or more data processing components 102, a memory 104, and a memory controller 106.

In one embodiment, the data processing component 102, the memory 104, and the memory controller 106 are implemented in the same integrated circuit (IC) package, such as in a system-on-a-chip (SOC). Alternatively, the memory controller 106 and the memory 104 can be implemented together in the same IC package separate from the one or more data processing components 102. As yet another example, the memory controller 106 can be implemented in a separate IC package so as to allow the memory controller 106 the flexibility to be implemented with a variety of combinations of memory types and data processing component types.

The one or more data processing components 102 can include any of a variety of components that produce, receive, or store data. Examples of the data processing component 102 include a data processor, such as a central processing unit (CPU) or a graphics processing unit (GPU), a multimedia decoder, encoder, or transcoder, an analog-to-digital converter (ADC), and the like. The memory 104 can include, for example, a random access memory (RAM), a flash memory, and the like.

The memory controller 106 includes a hardware controller 110, a mode control input 111, a local storage component 112, such as a local memory, a cache, or a register file, a control interface 114, a report interface 116, a data interface 118, a buffer interface 120, and a memory interface 122. The control interface 114 communicates control information 124 between the memory controller 106 and the data processing component 102. The report interface 116 communicates report information 126 to the data processing component 102. The data interface 118 communicates data between the data processing device 102 and the memory controller 106. The buffer interface 120 buffers write data received from the data processing component 102 for storage in the memory 104 and buffers read data accessed from the memory 104 for output to the data processing component 102. An example implementation of the buffer interface 120 is described below with reference to FIG. 16. The memory interface 122 interfaces with the memory 104, particularly in the event that the memory 104 is implemented as a separate integrated circuit package. The hardware controller 110 includes digital logic circuitry and other circuitry to provide a hardware implementation of the functionality described herein. For example, the hardware controller 110 can include a state machine implemented via an application specific integrated circuit (ASIC), a programmable logic device such as a programmable logic array, and the like. An example implementation of the hardware controller 110 is described below with reference to FIG. 15.

For memory management purposes, the hardware controller 110 logically partitions the memory 104 into one of three memory models ("monolithic", "fragmented", and "combined," discussed below) that incorporate blocks, block segments, or a combination thereof, and uses the selected logical partitioning to store variable-sized data units received from the one or more data processing components 102. The data units include logical groupings of data, such as data files (e.g., media files), tables, lists, etc. The hardware controller 110 utilizes a locator map table 130, stored at the local storage component 112, to maintain mapping information for data units stored at the memory 104. The locator map table 130, in one embodiment, includes a global mapping entry 134 and a plurality of locator entries 135, 136, 137, and 138, each associated with a corresponding locator identifier (ID). The global mapping entry 134 stores the global mapping information and each locator entry stores locator mapping information for a corresponding data unit. The particular mode to be implemented by the hardware controller is set via the mode control input 111, which can include, for example, a register or input pin so as to dynamically set the mode, or which can include, for example, a fuse bank, a flash memory or a one-time programmable memory to fix the particular mode to be implemented upon manufacture or implementation of the memory controller in a system.

The hardware controller 110 uses the global mapping information to identify which blocks/block segments have been mapped and which blocks/block segments are currently available for mapping to store incoming data units. The hardware controller 110 uses the locator mapping information to identify the blocks or block segments mapped to a locator entry for purposes of reading out or erasing the data unit associated with the locator entry (or for writing data to the mapped blocks/block segments for write-modify operations). Further, in certain modes a block segment may be further fragmented to become another plurality of smaller block segments (referred to herein as a "segment set") and, in this instance, each fragmented block or segment set has at its most base address stored information maintained by the hardware controller 110 so as to aid the hardware controller 110 in identifying block segments that are neither mapped nor further fragmented for purposes of storing data of a data unit at the available block segments.

Figure 2:
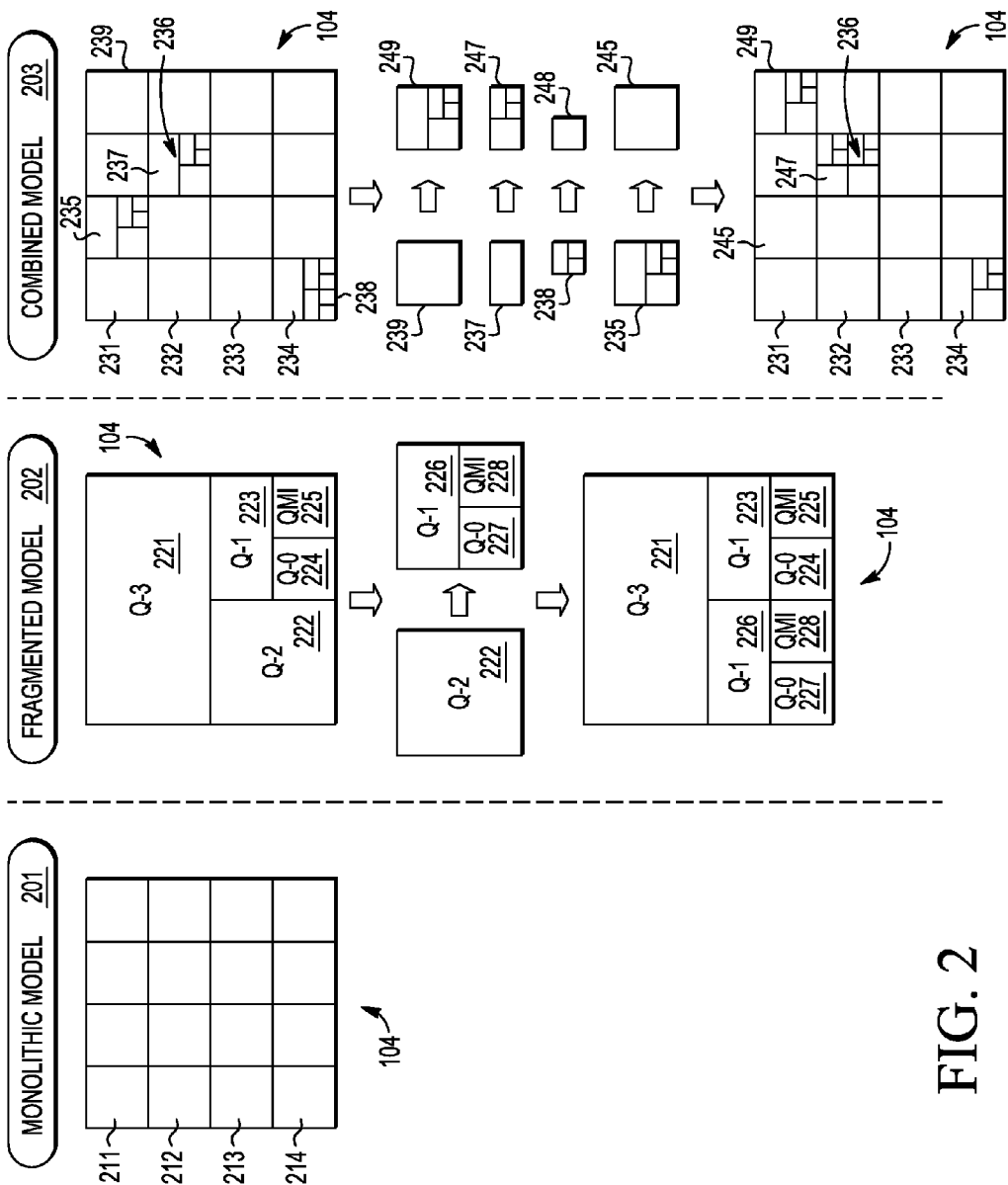
FIG. 2 is a diagram illustrating examples of three memory models implementable by the data processing device of FIG. 1 in accordance with at least one embodiment of the present disclosure.

Referring to FIG. 2, the three memory models or modes that may be employed by the memory controller 106 for the memory 104 are illustrated in accordance with at least one embodiment of the present disclosure. FIG. 2 also is used to introduce certain terms relating to the logical partitioning performed by the hardware controller 110 in accordance with these three memory models.

For memory management purposes, the hardware controller 110 logically partitions the memory 104 in accordance with one of three memory models of the memory 104: a monolithic model 201 (or "monolithic mode"); a fragmented model 202 (or "fragmented mode"); and a combined model 203 (or "combined mode"). The hardware controller 110 may be designed to be able to employ any one of these memory models at a given time (e.g., by writing a particular value to a register, by driving a particular voltage level at a particular pin of an IC package implementing the hardware controller 110, etc.), and the hardware controller 110 may be able to change between the different memory models (e.g., after a power-on-reset). Alternatively, the hardware controller 110 may be designed so as to employ only one of the memory models.

In the monolithic model 201, the hardware controller 110 partitions the memory 104 into a plurality of monolithic blocks (e.g., monolithic blocks 211, 212, 213, and 214). Each monolithic block is of an equal, fixed size and aligned to boundaries that are multiples of the same fixed size. The size of the monolithic blocks and their other characteristics are chosen according to the structure and size of the memory 104. Although FIG. 2 illustrates an example whereby the memory 104 is partitioned into sixteen monolithic blocks, it will be appreciated that the memory 104 can be partitioned into any number of monolithic blocks (given that each monolithic block remains larger than the individually-addressable storage elements, or "atomic" storage element, of the memory 104 as noted below). Each monolithic block capable of being mapped to only one locator at any given time (and thus capable of storing data from only one data unit at any given time) and whereby the monolithic blocks, being monolithic, are not permitted to be logically partitioned any further. Accordingly, the hardware controller 110 maps the memory 104 to data units on a monolithic block-by-monolithic block basis. Moreover, each monolithic block contains more than one atomic storage element of the memory 104. To illustrate, whereas the memory 104 may have atomic storage units of, for example, eight bytes, under the monolithic model 201 each monolithic block includes multiple atomic storage units, such as, for example, sixty-four bytes (or eight atomic storage units).

For the monolithic model 201, the global mapping information stored in the locator table 130 (FIG. 1) can include a global monolithic usage value that identifies which of the plurality of monolithic blocks of the memory 104 are mapped and which are unmapped. As an example, each bit position of the global monolithic usage value can be associated with a corresponding monolithic block, and the availability, or mapped status, of that monolithic block is represented by the bit value at that bit position. Further, the global monolithic usage value may correspond to the sum of the blocks mapped as monolithic blocks for every locator such that the hardware controller 110, based on this value, may identify any unmapped monolithic block.

To illustrate, a bit value of "1" at a bit position of the global monolithic usage value indicates that the corresponding monolithic block is already mapped to a locator entry or that the corresponding block had been fragmented, whereas a bit value of "0" at the bit position indicates that the corresponding monolithic block is not mapped. To illustrate, assuming the memory 104 is partitioned into sixteen blocks, a global monolithic map value of "0010_1000_0000_0001" could indicate that the first, twelfth, and fourteenth monolithic blocks are mapped and the remaining thirteen monolithic blocks are available for mapping. Similarly, a global monolithic usage value of "1000_0000_0000_0000" would indicate that only the sixteenth monolithic block was mapped, with the first fifteen monolithic blocks being available.

For the monolithic model 201, each locator entry (e.g., locator entries 135-138, FIG. 1) stores a locator monolithic usage value identifying which monolithic blocks of the memory 104 are mapped to the corresponding locator (i.e., are mapped to store data of the data unit associated with the locator entry). As with the global monolithic usage value, each bit position of the locator monolithic usage value can be associated with a corresponding monolithic block such that the bit value at the bit position indicates whether the corresponding monolithic block is mapped to the locator entry. To illustrate, again assuming the memory 104 is partitioned into sixteen blocks, a locator monolithic usage value of "0000_0000_0000_0101" would indicate that the first and third blocks of the sixteen blocks are mapped to the locator entry for storage of an associated data unit.

In the fragmented model 201, the hardware controller 110 partitions the memory 104 into a plurality of block segments, each block segment with a size corresponding to a power of 2 ($2^X$) according to the quantum X, or sub-order X, of the block segment. Thus, for a portion of the memory 104 having a size $B^k$, the portion is logically partitioned into a set of k block segments, whereby a block segment i has a size $B^i$ for i=0 to k−1. Thus, as illustrated in FIG. 2, for a base B=2, the size of the block segment with the highest-order quantum has a size corresponding to half the size of the memory 104, and each block segment of each successive lower-order quantum has a size that is one-half of the size of the block segment of the next-highest order. Thus, the sizes of the block segments decrease by one-half for each lower-order quantum from half of the size of the memory 104 to the smallest addressable storage element of the memory 104, in which case there will be two block segments of this size. To illustrate, the memory 104 of FIG. 2 is sized so as to permit an order-4 fragmentation such that block segments with quanta 3, 2, 1 and 0 are produced. In particular, the fragmentation of memory 104 in the example of the fragmented model 201 of FIG. 2 results in a quantum-3 block segment 221, a quantum 2 block segment 222, a quantum-1 block segment 223, a quantum-0 block segment 224, and an information block segment (block segment 225). In the example of FIG. 2, the size of the resulting block segments are a predetermined minimum size (e.g., the size of an atomic storage element or a certain multiple thereof). Accordingly, one of the block segments is designated as a quantum-0 block segment (block segment 224) and the other block segment (block segment 225) is designated as an information block segment that stores the quantum mapping information ("QMI" in FIG. 2) that identifies which block segments are mapped and which are available. As discussed in greater detail below, a block segment can be further fragmented so as to provide a set of two or more smaller block segments (the smaller block segments resulting from the further fragmentation of a block segment being referred to collectively as a "segment set"), and from which quantum mapping information is generated so as to identify which block segments have been further fragmented in this manner.

To illustrate the fractal-like fragmentation using simple example values, assume the memory 104 has a size of 256 bytes with a smallest addressable storage element of one byte. In this case, the memory 104 would support an order-7 fragmentation, whereby the memory 104 is fragmented into one quantum-7 block segment of 128 ($2^7$) bytes, one quantum-6 block segment of 64 ($2^6$) bytes, one quantum-5 block segment of 32 ($2^5$) bytes, one quantum-4 block segment of 16 ($2^4$) bytes, one quantum-3 block segment of 8 ($2^3$) bytes, one quantum-2 block segment of 4 ($2^2$) bytes, one quantum-1 block segment of 2 ($2^1$) bytes, and two quantum-0 block segments of one byte each (whereby the one at the most base address is used as an information block segment to store the quantum mapping information for the memory 104). For purposes of this disclosure, the quantum mapping information is formatted as two binary values separated by a colon (":"), whereby the first binary value ("the block segment map value") identifies the mapping of the block segments and the second value ("block segment fragmentation value") identifies those quanta of the memory 104 (or of a corresponding segment set) that have been further fragmented. To illustrate, the value 11100111:00011000 indicates the block segments of sizes 128 (quantum-7), 64 (quantum-6), 32 (quantum 5), 4 (quantum-2), 2 (quantum-1) and 1 (quantum-0) bytes are already mapped and the block segments of sizes 16 (quantum-4) and 8 (quantum-3) bytes are further fragmented. Further, in this case, the sub-order blocks of sizes 16 (quantum-4) and 8 (quantum-3) bytes will include at their most base addresses corresponding quantum mapping information for the corresponding block segments with sizes 8, 4, 2 and 1 bytes and the corresponding block segments with sizes 4, 2 and 1 bytes respectively.

In the fragmented model 202, each block segment can be mapped to only one locator entry at any given time (i.e., each block segment can store data of only one data unit at any given time). However, in many instances the hardware controller 110 may have a data portion that is not the exact same size as any available block segment. In this instance, the hardware controller 110 could select a block segment of a higher-order (i.e., select a block segment with a size greater than the data portion) and store the data portion in this block segment. However, this will render the remaining portion of the block segment unusable for any further storage until the block segment is disassociated (or "demapped") from the locator entry. Accordingly, to minimize wasted storage capacity, the hardware controller 110 can further fragment a higher-order block segment into a corresponding segment set of lower-order block segments and then use just those lower-order block segments of the resulting segment set sufficient to store the data portion, thereby freeing the other unused block segments for storing another data portion. The set of two or more lower-order block segments resulting from the further fragmentation of a higher-order block segment is referred to herein as a "quantum-X segment set", where X designates the quantum of the original block segment that was fragmented to make the segment set. To illustrate, for a fragmentation of a quantum-3 block segment into a quantum-2 block segment, a quantum-1 block segment, a quantum-0 block segment, and a block segment of quantum-0 for storing quantum mapping information, the resulting set lower-order block segments would be referred to collectively as a "quantum-3 segment set."

As an example of the further fragmentation of a block segment, assume that the data portion has a size of one (1) byte and the only block segment available is quantum-2 block segment 222 (having a size of 4 bytes in this example). If quantum-2 block segment 222 is mapped to the data portion, there would be 3 bytes of wasted storage capacity. Accordingly, the hardware controller 110 instead can further fragment the quantum-2 block segment 222 to generate a quantum-1 block segment 226, a quantum-0 block segment 227, and an information block segment 228 of quantum-0 that is used to store the quantum mapping information for the quantum-2 segment set of block segments 226 and 227. The hardware controller 110 then could map the quantum-0 block segment 227 to store the data portion, leaving the quantum-1 block 226 available for mapping to another data portion of the same data unit or a different data unit. As another example, the quantum-3 block segment 221 could be further fragmented to generate a quantum-3 segment set comprising a quantum-2 block segment, a quantum-1 block segment, a quantum-0 block segment and another block segment of quantum-0 to store the quantum mapping information for the quantum-3 segment set. Thus, the fragmentation of a block segment of size $B^j$ (i.e., quantum j) results in a mapping information block segment and a set of j block segments, whereby for a block segment i of the set of j block segments has a size $B^i$ for i=0 to j−1. Read, write, and erase operations in the context of the fragment model 202 are described in greater detail below with reference to FIGS. 7-10.

Either of the monolithic model 201 or the fragmented model 202 alone may not provide a satisfactorily scalable solution as the size of the memory 104 increases (monolithic model constraint) and as the time to map should be as minimal as possible (fragmented model constraint). Accordingly, the combined model 203 provides a combination of the monolithic and fragmented models to provide a scalable solution suitable for a wide variety of sizes of the memory 104. In the combined model 203, the hardware controller 110 combines the monolithic model 201 and the fragmented model 202. The hardware controller 110 first partitions the memory 104 into a plurality of equal-size, fixed blocks. Each block may serve as a monolithic block to store data for only one data unit at a time (e.g., monolithic blocks 231, 232, and 233). However, to minimize wasted storage space, the hardware controller 110 may fragment selected blocks using the fragmentation process described above to generate corresponding fragmented blocks (e.g., fragmented blocks 234, 235, and 236) so that the block segments of the fragmented blocks can be mapped to more than one locator entry and so that the block segment(s) storing a data portion can be selected so as to minimize wasted storage capacity. Further, once all of the block segments of a fragmented block are no longer mapped, the hardware controller 110 can convert the fragmented block back to a monolithic block or its original quantum-N so that the full capacity of the resulting monolithic block or quantum-N can be used to store a data portion of equal size. Moreover, as with the fragmented model 202, a block segment of any given fragmented block may be further fragmented to generate a corresponding set of lower-order block segments so as to more closely tailor the sizes of the block segments used to store a data portion to the size of the data portion. For example, during operation, the hardware controller 110 may: fragment the monolithic block 239 to generate a fragmented block 249 of order-4; fragment the quantum-3 block segment 237 of the fragmented block 236 to form another quantum-3 segment set 247 in the fragmented block 236; convert the quantum-2 segment set 238 of the fragmented block 234 to a single quantum-2 block segment 248 in the fragmented block 234; and convert the fragmented block 235 back to a monolithic block 245. Read, write, and erase operations in the context of the combined model 202 are described in greater detail below with reference to FIGS. 11-14.

Figure 3:
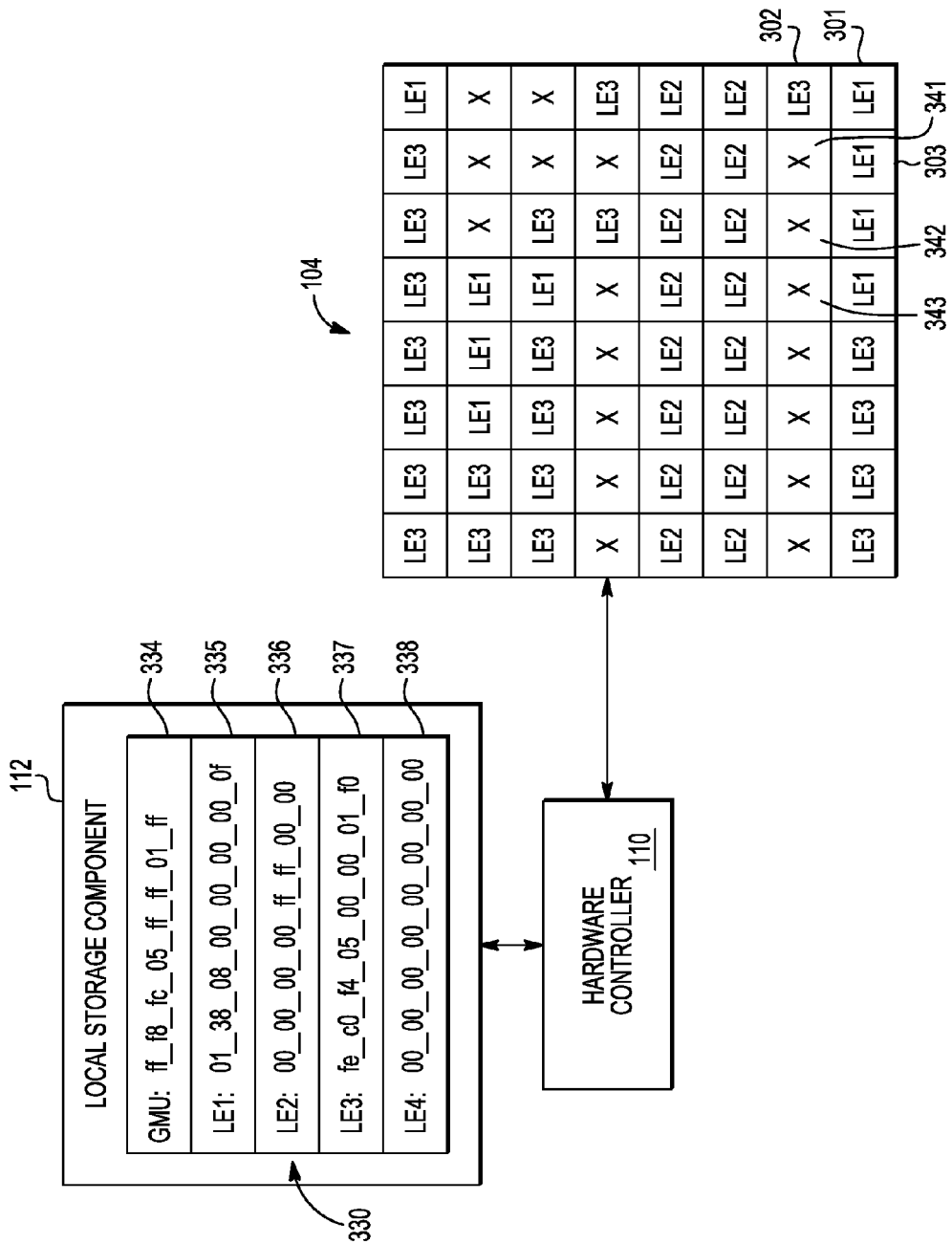
FIG. 3 is a diagram illustrating an example configuration of the data processing device of FIG. 1 for a monolithic model of a memory in accordance with at least one embodiment of the present disclosure.

Referring to FIG. 3, an example implementation of the memory controller 106 in the monolithic model 201 is illustrated in accordance with at least one embodiment of the present disclosure. As noted above, for the monolithic model 201, the hardware controller 110 partitions the memory 104 into a plurality of monolithic blocks (e.g., blocks 301, 302, and 303) of a fixed, equal size and aligned to boundaries that are multiples of this size. Being monolithic, each of these blocks is used by the memory controller 106 to store that data of only one data unit at a time. Because the data of a data unit may not fully fill each monolithic block mapped to the data unit, the corresponding locator entry may include one or more fields to identify initial and ending indexes inside the last monolithic block mapped to a locator to help hardware controller 110 to identify where the partial data is stored in the last monolithic block. These fields can include, for example, a start field and an offset field or a start field and an end field.

In the depicted example, the memory 104 has been partitioned into sixty-four (64) monolithic blocks. Accordingly, the global monolithic usage value (GMU in FIG. 3) stored in the global mapping entry 334 (corresponding to the global mapping entry 134 of FIG. 1) of the locator map table 330 (corresponding to the locator map table 130 of FIG. 1) comprises sixty-four bit positions, each bit position corresponding to a different block of the sixty-four monolithic blocks of the memory 104. The value at each bit position of the global monolithic usage value indicates whether the corresponding monolithic block has been mapped or is available for mapping. Further, in the example of FIG. 3 there are four locator entries 335, 336, 337, and 338 (also identified as locator entries 1, 2, 3, and 4 or LE1, LE2, LE3, and LE4) of the locator map table 330 available for association with data units. Each locator entry stores a respective locator monolithic usage value that represents which monolithic blocks of the sixty-four monolithic blocks of the memory 104 are mapped to the respective locator entry. As with the global monolithic usage value, the locator monolithic usage values comprise sixty-four bit positions, whereby the value at each bit position indicates whether a corresponding monolithic block of the sixty-four blocks is mapped to the corresponding locator entry. In one embodiment, the global monolithic usage value represents the sum (logical OR for positive logic or logical AND for negative logic) of every locator monolithic usage value of the locator map table 330. For conciseness, the global monolithic usage value and the locator monolithic usage values are depicted in FIG. 3 as hexadecimal values.

In the example of FIG. 3, the locator entry 1 (LE1) is mapped nine monolithic blocks as depicted, the locator entry 2 (LE2) is mapped sixteen monolithic blocks as depicted, the locator entry 3 (LE3) is mapped twenty-one monolithic blocks, the locator entry 4 (LE4) does not have any mapped monolithic blocks (e.g., is not associated with a data unit, so it is available for a write request from data processing component), and the remaining eighteen monolithic blocks remain unmapped and so available for future mapping.

Figure 4:
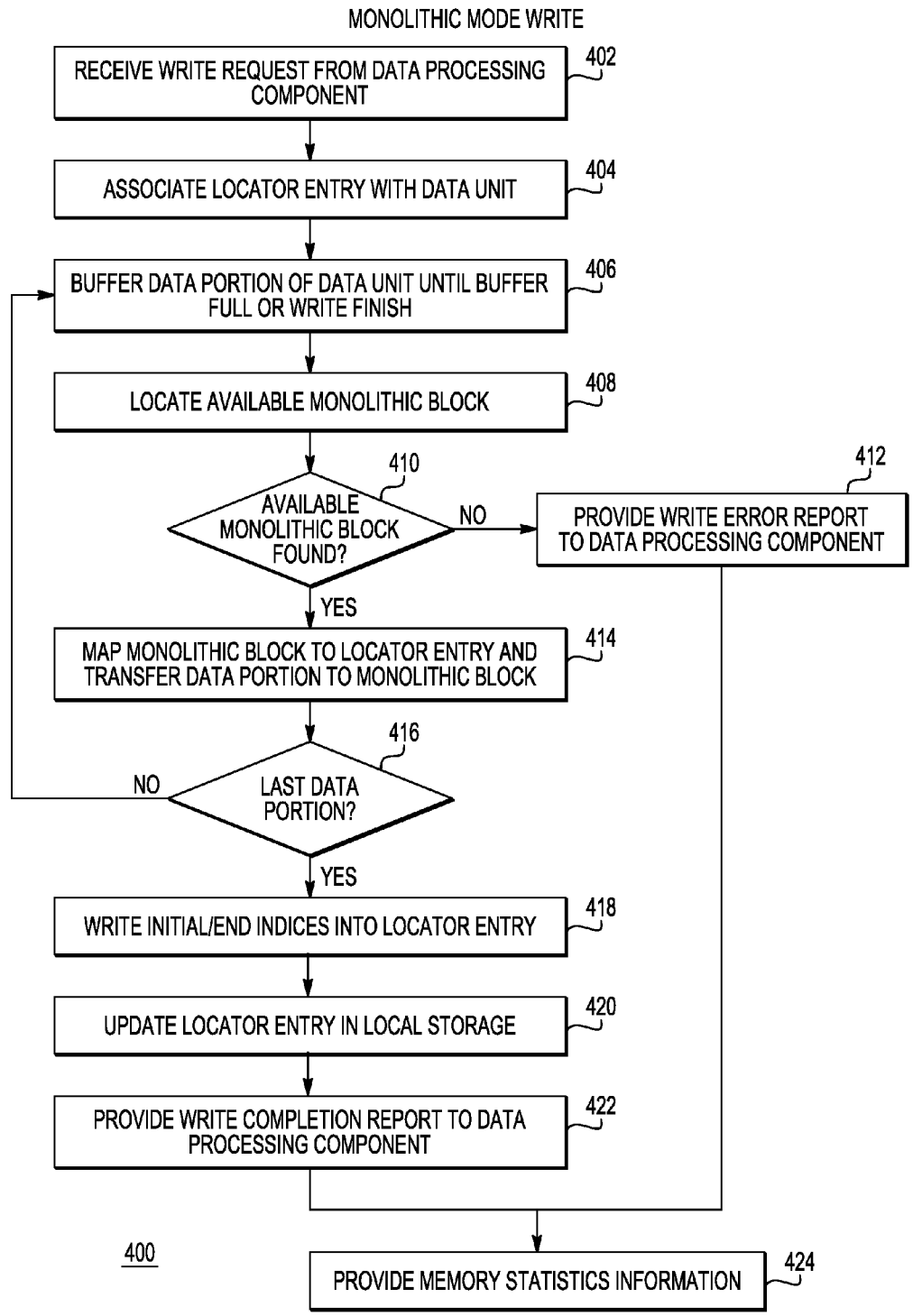
FIG. 4 is a flow diagram illustrating a method for writing a data unit to a memory of the data processing device of FIG. 1 based on a monolithic modeling of the memory in accordance with at least one embodiment of the present disclosure.
Figure 5:
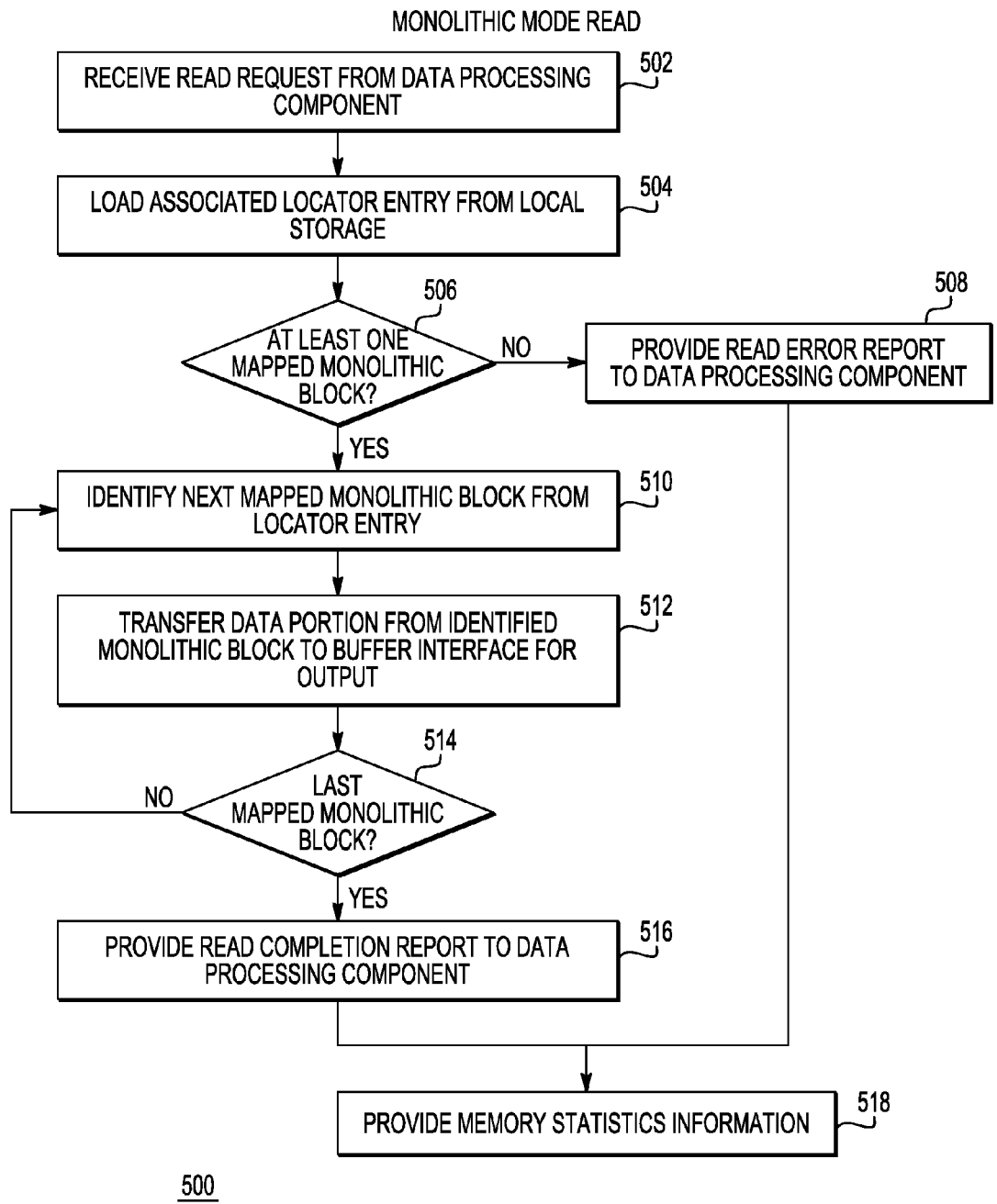
FIG. 5 is a flow diagram illustrating a method for reading a data unit from a memory of the data processing device of FIG. 1 based on a monolithic modeling of the memory in accordance with at least one embodiment of the present disclosure.
Figure 6:
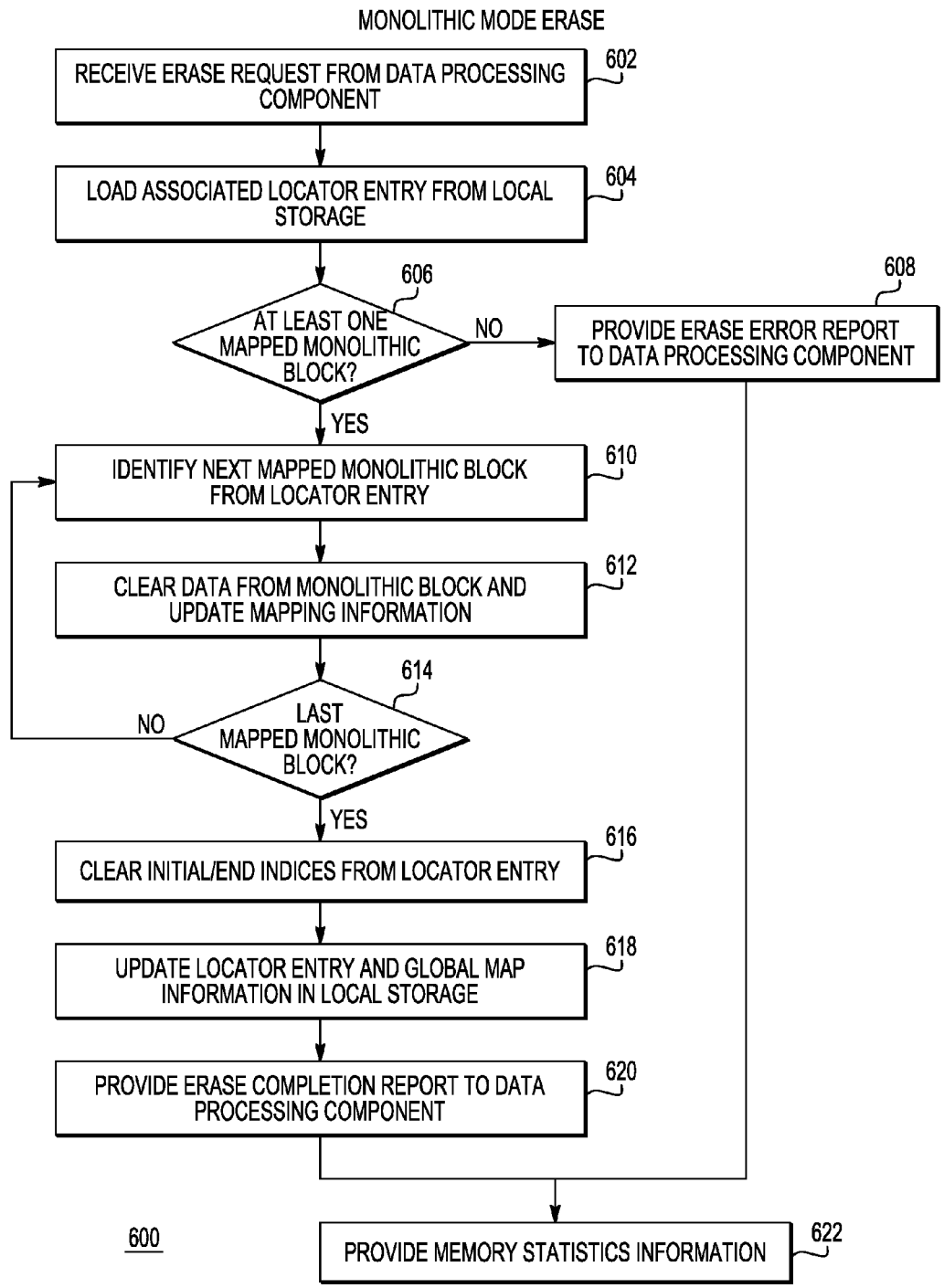
FIG. 6 is a flow diagram illustrating a method for erasing a data unit from a memory of the data processing device of FIG. 1 based on a monolithic modeling of the memory in accordance with at least one embodiment of the present disclosure.

FIGS. 4, 5, and 6 illustrate example methods for a write operation, a read operation, and an erase operation, respectively, for the memory controller 106 when the hardware controller 110 is operating in an monolithic mode that implements the monolithic model 201 (FIG. 2). For ease of illustration, the methods of FIGS. 4-6 are described in the context of the example implementation of FIG. 3. Further, although certain processes are depicted and described in a certain sequence in FIGS. 4-6 for ease of illustration, it will be appreciated that these processes can be performed in parallel or in different orders than those illustrated except where expressly indicated.

The write method 400 of FIG. 4 initiates at block 402 whereby the data processing component 102 determines a select data unit (e.g., a data file) to be stored at the memory 104 and signals a write request to the memory controller 106. The write request can include write configuration information, such as permission information or priority information, as part of the control information 124 signaled from the data processing component 102 to the control interface 114 of the memory controller 106. In one embodiment, the data processing component 102 may have previously identified a particular locator to be associated with the select data unit (e.g., if the write operation is a write-map request or a write-modify request) and the write request further can include an indicator of this identified locator. Alternatively, if the data processing component 102 has not yet specified a particular locator, at block 404 the hardware controller 110 scans the locator map table 130 to identify and select a locator entry available for association with the data unit and then associates the selected locator entry with the data unit. In another embodiment, the write request may be for the purposes of reserving a locator for a subsequent data transfer, and thus this write request instead may specify a data size to be reserved for a locator without concurrently providing the data unit for storage (identified as a "write-map request"), for which the memory controller 106 identifies an available locator and provides the corresponding locator ID to the data processing component 102. With the locator already mapped, the data processing component 102 can later store data to the memory 104 using the previously-mapped locator using a "write-modify request."

At block 406, the data processing component 102 then initiates transfer of the data unit as data information 128 to the data interface 118 of the memory controller 106. The data being transferred is then buffered in the buffer interface 120. Once the buffered data portion has reached the size of a monolithic block or the write transfer has finished, at block 206 the hardware controller 110 determines the size of the current data portion buffered in the buffer interface 120 based on, for example, the write ending sequence received through the control interface 114 or the data processing component 102 may provide the data size as control information 124 sent as part of the write request.

At block 408, the hardware controller 110 accesses the global monolithic usage value from the locator map table 330 and uses the global monolithic usage value to identify an available monolithic block in which to store the buffered data portion. As noted above, the global monolithic usage value can comprise a plurality of bit positions, each representative of the availability status of a corresponding monolithic block. Accordingly, the hardware controller 110 can identify an available monolithic block by, for example, right shifting the global monolithic usage value to identify the first bit position a bit value of "0", thereby identifying the corresponding monolithic block as available for mapping. In one embodiment, the hardware controller 110 proceeds from the lower numbered monolithic blocks to higher numbered monolithic blocks, or vice versa, to identify an available monolithic block. Alternatively, the hardware controller 110 may select an initial index at random for the start of the search of an available monolithic memory when the memory 104 is susceptible to write frequency so as to bring the average cell usage close to a mean value among overall cells into the memory 104. In the event that the hardware controller 110 is unable to identify an available monolithic at block 410, the memory controller 106 will be unable to store the data portion to the memory 106 and thus at block 412 the memory controller 106 provides a write error report to the data processing component 102.

Otherwise, if an available monolithic block is found, at block 414 the hardware controller 110 maps the identified monolithic block to the locator associated with the data unit and transfers the data portion to the identified monolithic block for storage. In one embodiment, the hardware controller 110 maps the identified monolithic block by modifying the bit value at the corresponding bit position of a local copy of both the global monolithic usage value and locator monolithic usage value to reflect the mapped status of the monolithic block.

At block 416, the hardware controller 110 determines whether the data portion being processed is the last data portion of the data unit, or if there is additional data to write to the memory 104 for the data unit. If there is additional data, the process represented by blocks 406, 408, 410, 414, and 416 is repeated for the next data portion of the data unit.

As the data unit often will not have a size that is an integer multiple of the size of the monolithic block, the last data portion likely will be smaller than the size of a monolithic block. Accordingly, when the memory controller 106 has completed the storage of the last data portion of the data unit, at block 418 the hardware controller 110 determines the initial index and final index of the last data portion in the corresponding monolithic block and stores values representative of the initial and final indices in the locator entry.

At block 420, the hardware controller 110 updates the global monolithic usage value and the locator entry of the locator map table 330 by storing its updated local copies to the corresponding fields of the local storage component 112. Upon verification that both the data unit was correctly stored in the memory 104 and mapping information was correctly stored in the local storage component 112, at block 422 the hardware controller 110 generates a write completion report and provides the write completion report as report information 126 via the report interface 116 to the data processing component 102 that was the source of the write request. The write completion report, in one embodiment, includes a locator value identifying the locator entry associated with the data unit in the event that the locator value was not originally identified by the data processing component 102. The write completion report further can include overall results of the write operation, a ready/error indication, and the like. Alternatively, the locator value can be provided as control information 124 via the control interface 114. The data processing component 102 or other component of the data processing device 100 then can use this locator value to subsequently access the data unit in the memory 104 via the memory controller 106 for read or erase operations. To facilitate compatibility with a wide variety of systems, the locator value can be formatted to appear as a linear memory address (virtual or physical) of a format typically used with the type of architecture of the memory 104. Further, at block 424 the memory controller 106 can provide memory statistics information to the data processing component 102 via the report interface following the write completion report (block 422) or the write error report (block 412), whereby the memory statistics information can include, for example, an empty/full state of the memory 104, an indication of the overall remaining storage available to be mapped, and the like.

As an illustration of the write operation of method 400, assume that a write request for a new data unit is received at the hardware controller 110 in the context of the implementation illustrated by FIG. 3. The hardware controller 110 would assign the available locator entry LE4 (locator entry 338). Assume, in this example, three monolithic blocks in total are needed to store the data unit, the hardware controller 110 would access and analyze the global monolithic usage value to identify the blocks 341, 342, and 343 as three blocks available for allocation. The hardware controller 110 then writes the corresponding data portions of the data unit to the three identified blocks 341, 342, and 343, one by one, as they are transferred in. Based on the positions of blocks 341, 342, and 343, the hardware controller 110 writes a "1" to the corresponding bit positions of the global monolithic usage value and the locator monolithic usage value of the locator entry 338. As a result, the global monolithic usage value is changed from "ff_f8_fc_05_ff_ff_01_ff" to "ff_f8_fc_05_ff_ff_0f_ff" and the locator monolithic usage value changes from "00_00_00_00_00_00_00_00" to "00_00_00_00_00_0c_00". In one embodiment, the buffer interface 120 implements two buffers of the monolithic block size. Accordingly, as soon as one buffer is filled with data from an incoming data unit, the hardware controller 110 can assign a monolithic block immediately and begin transferring the buffered data to the assigned monolithic block. Meanwhile, the buffer interface 120 can begin filling the other buffer, thereby, giving to the external data interface the continuous sense of the data flow into this locator write operation.

The read method 500 of FIG. 5 initiates at block 502 whereby the data processing component 102 determines a select data unit (e.g., a data file) to be read from the memory 104 and signals a read request to the memory controller 106. The read request can include read configuration information, such as permission information or priority information, as part of the control information 124 signaled from the data processing component 102 to the control interface 114 of the memory controller 106. The read request further includes the locator ID of the data unit determined when the data unit was stored to the memory 104 (using the write operation described in FIG. 4). At block 504, the hardware controller 110 accesses the locator map table 330 and loads a local copy of the locator entry associated with the provided locator ID.

At block 506, the hardware controller 110 uses the local copy of the locator monolithic usage value to verify the number of monolithic blocks, if any, are mapped to the locator entry. As noted above, the locator monolithic usage value can comprise a plurality of bit positions, each identifying whether a corresponding monolithic block is mapped to the locator entry. In the event that the hardware controller 110 is unable to identify any monolithic blocks mapped to the locator entry, the memory controller 106 will be unable to read any data for the locator ID provided and thus at block 508 the memory controller 106 provides a read error report to the data processing component 102.

Otherwise, if the locator monolithic usage value indicates at least one monolithic block is mapped to the locator entry, at block 510 the hardware controller 110 identifies and accesses that mapped monolithic block and at block 512 the data portion stored in that mapped monolithic block is transferred to the buffer interface 120 for output to the data processing component 102. The process represented by blocks 510 and 512 is repeated for the next mapped monolithic block and each mapped monolithic block thereafter until the last mapped monolithic block has been determined to have been accessed and read at block 514. As the last mapped monolithic block may not be completely full with data for the data unit, the initial/final indices for the last monolithic block stored at the locator entry (see block 418, FIG. 4) may be accessed and used to access and transfer the appropriate portion from the last mapped monolithic block. In one embodiment, the buffer interface 120 alternates between two buffers as described above.

Upon verification that both the data unit was correctly and fully read from the memory 104, at block 516 the hardware controller 110 generates a read completion report and provides the read completion report as report information 126 via the report interface 116 to the data processing component 102 that was the source of the read request. The read completion report, in one embodiment, includes overall results of the write operation, a ready/error indication, and the like. Further, at block 518 the memory controller 106 can provide memory statistics information to the data processing component 102 via the report interface following the read completion report (block 516) or the read error report (block 508).

As an illustration of the read operation using the example implementation of FIG. 3, assume that a read request to read the data unit associated with locator entry LE1 is received by the hardware controller 110. Accordingly, the hardware controller 110 accesses the locator entry LE1 (locator entry 335) and analyzes the locator monolithic usage value stored therein to identify the nine monolithic blocks associated with the locator entry LE1 and the proper sequence among the identified nine blocks. The hardware controller 110 then accesses the data stored at the identified nine monolithic blocks, one by one in the proper sequence, transferring the accessed data as a return data for the corresponding read sequence, and outputs the resulting data unit as described above.

The hardware controller 110 further can implement write-map requests and write-modify requests in the monolithic model 201 by adapting the write method 400 and the read method 500 described above. To illustrate, a write-map request can be performed by mapping the monolithic blocks to a data unit as described in the write method 400 without transferring any data at that point to the mapped monolithic blocks. For a write-modify request, the monolithic blocks already mapped to that data unit can be identified and accessed in accordance with the process described in the read method 500 and then the new data written to the identified monolithic block using the write process described in the write method 400.

The erase method 600 of FIG. 6 initiates at block 602 whereby the data processing component 102 determines a select data unit (e.g., a data file) to be erased from the memory 104 and signals an erase request to the memory controller 106. The erase request can include erase configuration information, such as permission information or priority information, as part of the control information 124 signaled from the data processing component 102 to the control interface 114 of the memory controller 106. The erase request further includes the locator ID of the data unit determined when the data unit was stored to the memory 104 (using the write operation described in FIG. 4). At block 604, the hardware controller 110 accesses the locator map table 330 and loads a local copy of the locator entry associated with the provided locator ID and loads a local copy of the global monolithic usage value.

At block 606, the hardware controller 110 uses the local copy of the locator monolithic usage value to identify those monolithic blocks mapped to the locator entry. In the event that the hardware controller 110 is unable to identify any monolithic blocks mapped to the locator entry, the memory controller 106 will be unable to erase any data for the locator ID provided and thus at block 608 the memory controller 106 provides an erase error report to the data processing component 102.

Otherwise, if the locator monolithic usage value indicates at least one monolithic block is mapped to the locator entry, at block 610 the hardware controller 110 identifies and accesses the mapped monolithic block and at block 612 the hardware controller 110 clears or otherwise erases the data portion stored into the mapped monolithic block. Further, the hardware controller 110 modifies the mapping information of the locator map table 330 to reflect the erasure of the data portion from the monolithic block by clearing the corresponding bit position in the local copies of both the global monolithic usage value and the locator monolithic usage value (e.g., by writing a "0" to the bit position). The process represented by blocks 610 and 612 is repeated for the next mapped monolithic block and each mapped monolithic block thereafter until the last mapped monolithic block has been determined to have been accessed and erased at block 614. As the last mapped monolithic block may not be completely full with data for the data unit, the initial/final indices for the last monolithic block stored at the locator entry (see block 418, FIG. 4) may be accessed and used to erase the appropriate portion from the last mapped monolithic block.

At block 616, the hardware controller 110 clears the initial/end indices from the locator entry to reflect the erasure of the data unit and at block 618 the hardware controller 110 updates the locator entry in the locator map table 330 by writing the updated local copy of the locator monolithic usage value to the locator entry (or by clearing the locator entry completely) and updates the global monolithic usage value in the locator map table by writing the updated local copy of the global monolithic usage value to the locator map table 330. Upon verification that both the data unit was correctly erased at the memory 104 and mapping information was correctly updated in the local storage component 112, at block 620 the hardware controller 110 generates an erase completion report and provides the erase completion report as report information 126 via the report interface 116 to the data processing component 102 that was the source of the erase request. Further, at block 622 the memory controller 106 can provide memory statistics information to the data processing component 102 via the report interface following the erase completion report (block 620) or the erase error report (block 608).

As an illustration of the erase operation of FIG. 6 in the context of the implementation of FIG. 3, assume that an erase request to clear the data unit associated with locator entry LE2 (locator entry 336) is received by the hardware controller 110. Accordingly, the hardware controller 110 clears the locator monolithic usage value stored at the locator entry 336 to reflect the demapping of the monolithic blocks previously mapped to the locator entry LE2. Thus, the locator monolithic usage value is changed from "00_00_00_00_ff_ff_00_00" to "00_00_00_00_00_00_00_00." Likewise, the global monolithic usage value is modified by writing a "0" to the bit positions corresponding to the blocks previously mapped to the locator entry LE2, thereby changing the locator monolithic usage value from "ff_f8_fc_05_ff_ff_01_ff" to "ff_f8_fc_05_00_00_01_ff".

Figure 7:
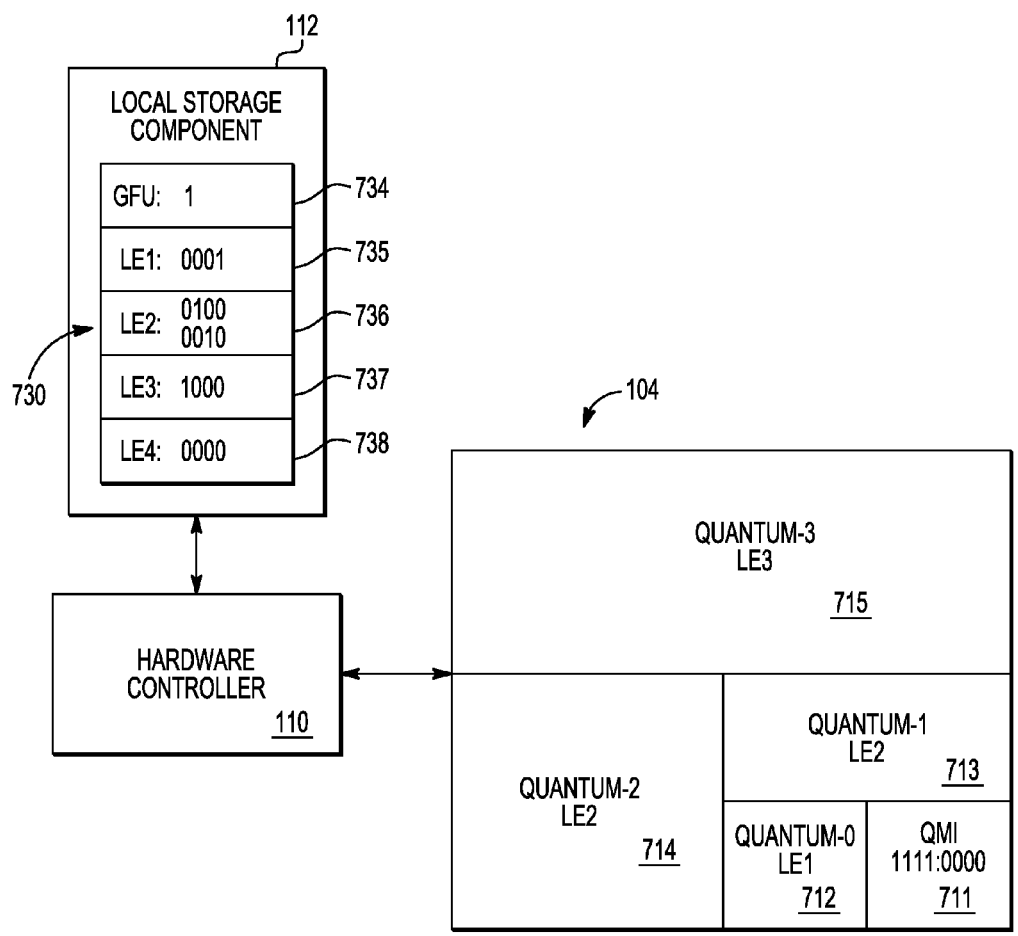
FIG. 7 is a diagram illustrating an example configuration of the data processing device of FIG. 1 for a fragmented model of a memory in accordance with at least one embodiment of the present disclosure.

Referring to FIG. 7, an example implementation of the memory controller 106 in the fragmented model 202 is illustrated in accordance with at least one embodiment of the present disclosure. As noted above, for the fragmented model 202, the hardware controller 110 logically partitions the memory 104 into a plurality of block segments of increasingly smaller sizes. Each of these block segments may be used by the memory controller 106 to store data of only one data unit at a time. Further, in one embodiment, the memory controller 106 can further fragment one or more of these block segments to form a set of lower-order block segments to allow a more finely-grained combination of block segments for storage of a data unit.

In one embodiment, the fragmentation process fragments an original block segment into a geometric regression, size-wise, in a manner that is particularly well-suited for alignment due to the binary numbering scheme used in conventional processing systems. In the depicted example of FIG. 7, the memory 104 has been partitioned in a fourth-order geometric (or fractal) division, whereby each block segment of a particular order or quantum is half the size of a block of the next higher order (if any) and is twice the size of a block segment of the next lowest order (if any). Due to the binary nature of this geometric sequence, the lowest quantum typically includes two block segments of equal sizes (e.g., block segments 711 and 712). In the example of FIG. 7, block segments 711 and 712 are quantum-0 order, block segment 713 is quantum-1 order, block segment 714 is quantum-2 order and block segment 715 is quantum-3 order. Accordingly, block segment 713 is twice the size Block segments 711 or 712, block segment 714 is twice the size Block segment 713, and block segment 715 is twice the size Block segment 714. Among the two quantum-0 order blocks, the one with lower address is used as an information block segment to store quanta mapping information for the quanta block segments instead of data of the data unit. While FIG. 7 shows one example whereby the memory 104 can be partitioned by a fourth-order geometric division, it will be appreciated that the memory 104 can be partitioned in any of a variety of orders or quanta based on the size characteristics of the memory 104.

As noted, the block segment at the most base address can be set aside for storage of quantum mapping information for the memory 104. In the illustrated example, the block segment 711 is used to store the quantum mapping information. Accordingly, as there is a single block that had been fragmented into four remaining blocks segments (block segments 712, 713, 714, and 715), the global fragmented usage value stored in the global mapping entry 734 (corresponding to the global mapping entry 134 of FIG. 1) of the locator map table 730 (corresponding to the locator map table 130 of FIG. 1) comprises a single-bit value (e.g., "1") to reflect the fragmented state of the memory 104 as a whole. The block segment 711 then stores the quantum mapping information ("1111:0000"), which includes a block segment map value ("1111") and a block segment fragmentation value ("0000"). In this example, the block segment map value includes a 4-bit value, each bit position N (N going from 3 to 0) indicating whether the corresponding block segment of quantum-N (of the four block segments 712, 713, 714, and 715) has been mapped or is available for mapping. In this example, all four block segments 712, 713, 714, and 715 are mapped to a locator, and thus the block segment map value is "1111". The block segment fragmentation value identifies those block segments that have been further fragmented (e.g., by a bit value "1" in the bit position corresponding to the fragmented block segment) into a corresponding lower-order segment set. Because none of the block segments 712-715 is further fragmented in this example, the block segment fragmentation value is "0000" for the example of FIG. 7.

In the example of FIG. 7 there are four locator entries 735, 736, 737, and 738 (also identified as locator entries 1, 2, 3, and 4, or LE1, LE2, LE3, and LE4) of the locator map table 730 available for association with data units. Each locator entry stores a locator fragmented usage value set that represents which quanta of the memory 104 are mapped to the respective locator entry as well as the full path to each of these quanta. The illustrated fragmentation process results in four different orders, or quanta, so the locator fragment usage values comprise four bit positions, whereby the value at each bit position indicates whether a corresponding quantum is mapped to the corresponding locator entry. Mapping in the event that one or more of the original block segments has been converted to a corresponding segment set of lower-order block segments is described below with reference to FIG. 11.

In the example of FIG. 7, quantum-0 (and thus block segment 712) is mapped to the locator entry 1 (LE1), quantum-1 and quantum-2 (and thus block segments 713 and 714) are mapped to the locator entry 2 (LE2), quantum-3 (and thus block segment 715) is mapped to the locator entry 3 (LE3), and the locator entry 4 (LE4) is unassociated with a data unit and thus does not have any mapped quanta. To reflect this mapping arrangement, the hardware controller 110 would set the locator fragment usage value of the locator entry 734 to "0001", the locator fragment usage values of the locator entry 735 to "0100" and "0010" to represent the two block segments mapped to the locator entry 1, the locator fragment usage value of the locator entry 736 to "1000" and the locator fragment usage value of the locator entry 738 to "0000", and the global fragment usage value to "1" so as to identify that the memory 104 has been fragmented and thus the hardware controller 110 should interpret the word at the most base address of the memory 104 as a QMI word.

Figure 8:
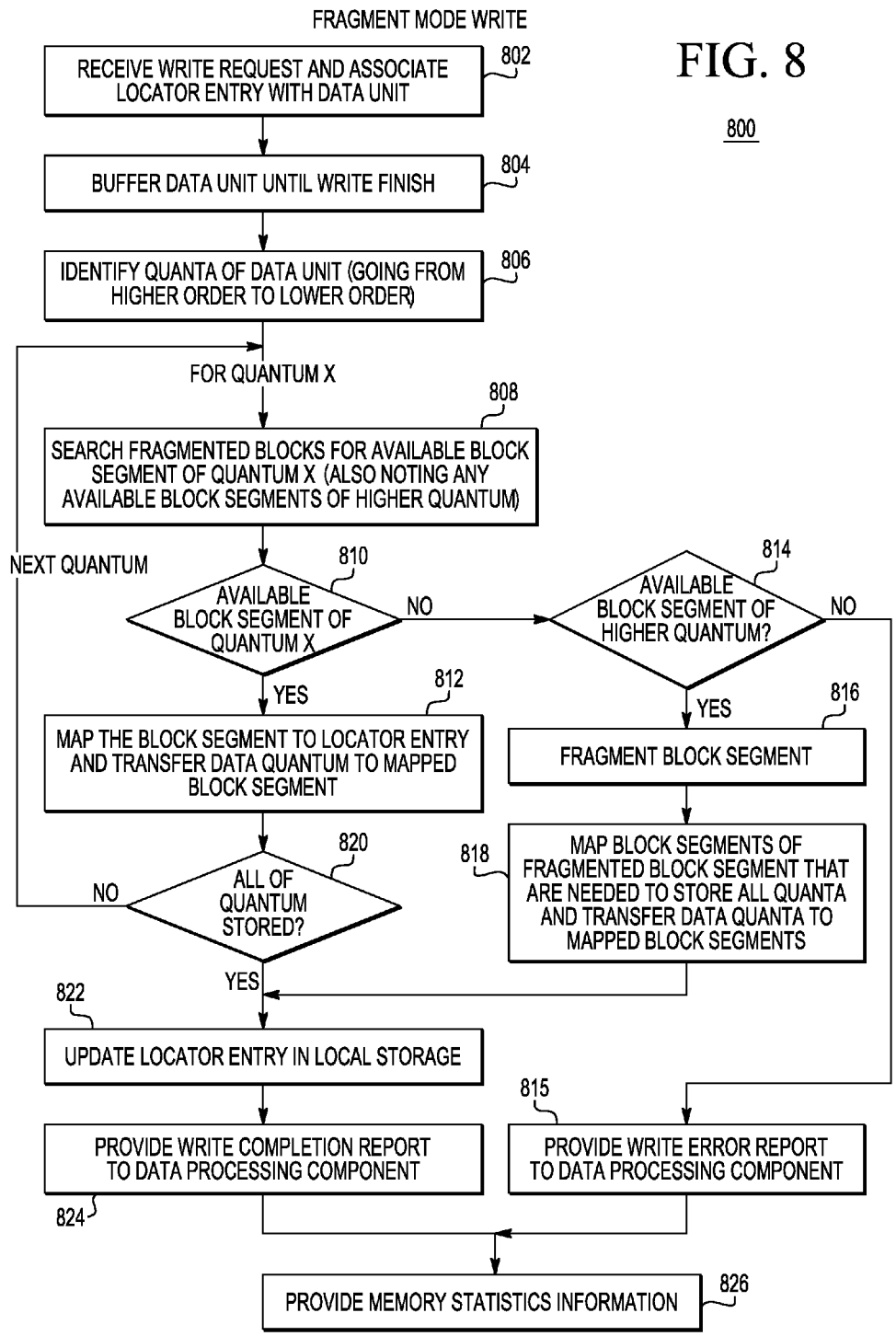
FIG. 8 is a flow diagram illustrating a method for writing a data unit to a memory of the data processing device of FIG. 1 based on a fragmented modeling of the memory in accordance with at least one embodiment of the present disclosure.
Figure 9:
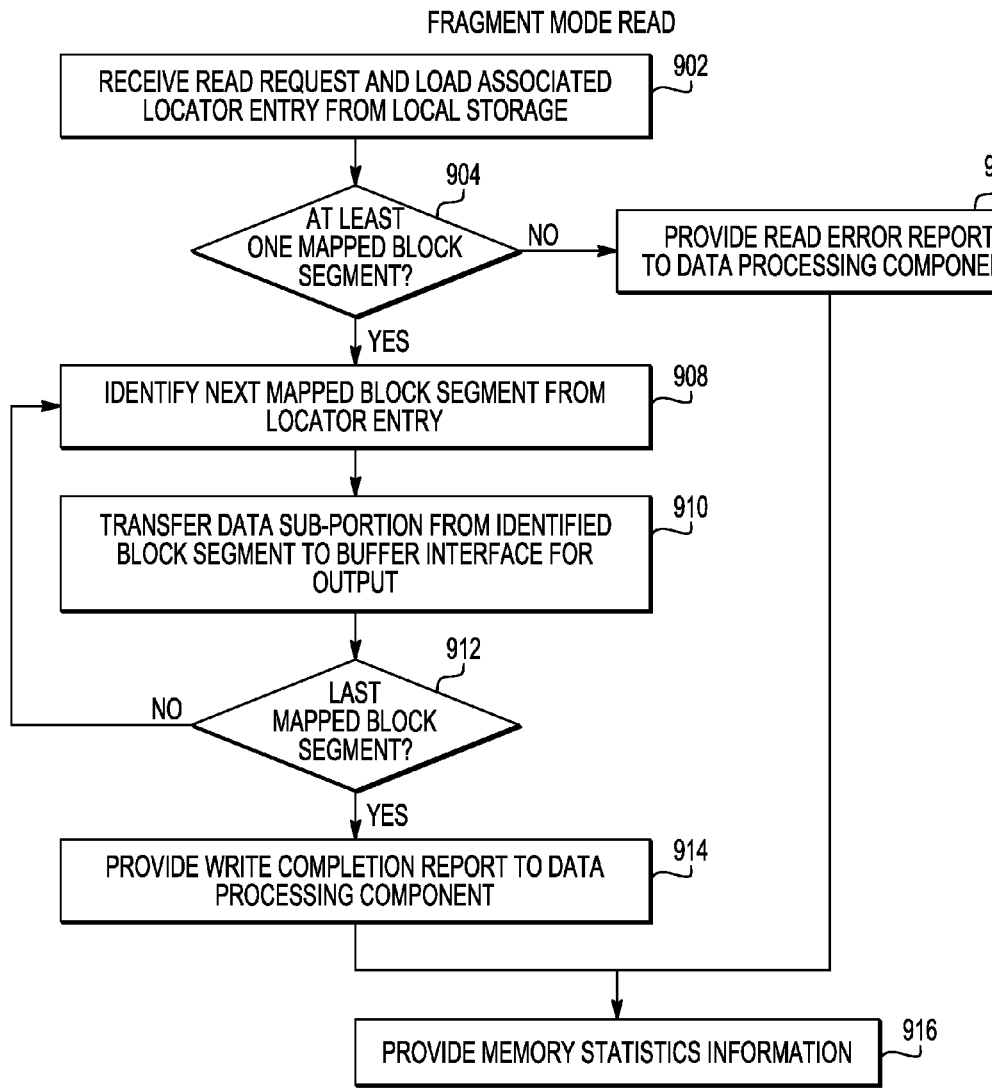
FIG. 9 is a flow diagram illustrating a method for reading a data unit from a memory of the data processing device of FIG. 1 based on a fragmented modeling of the memory in accordance with at least one embodiment of the present disclosure.
Figure 10:
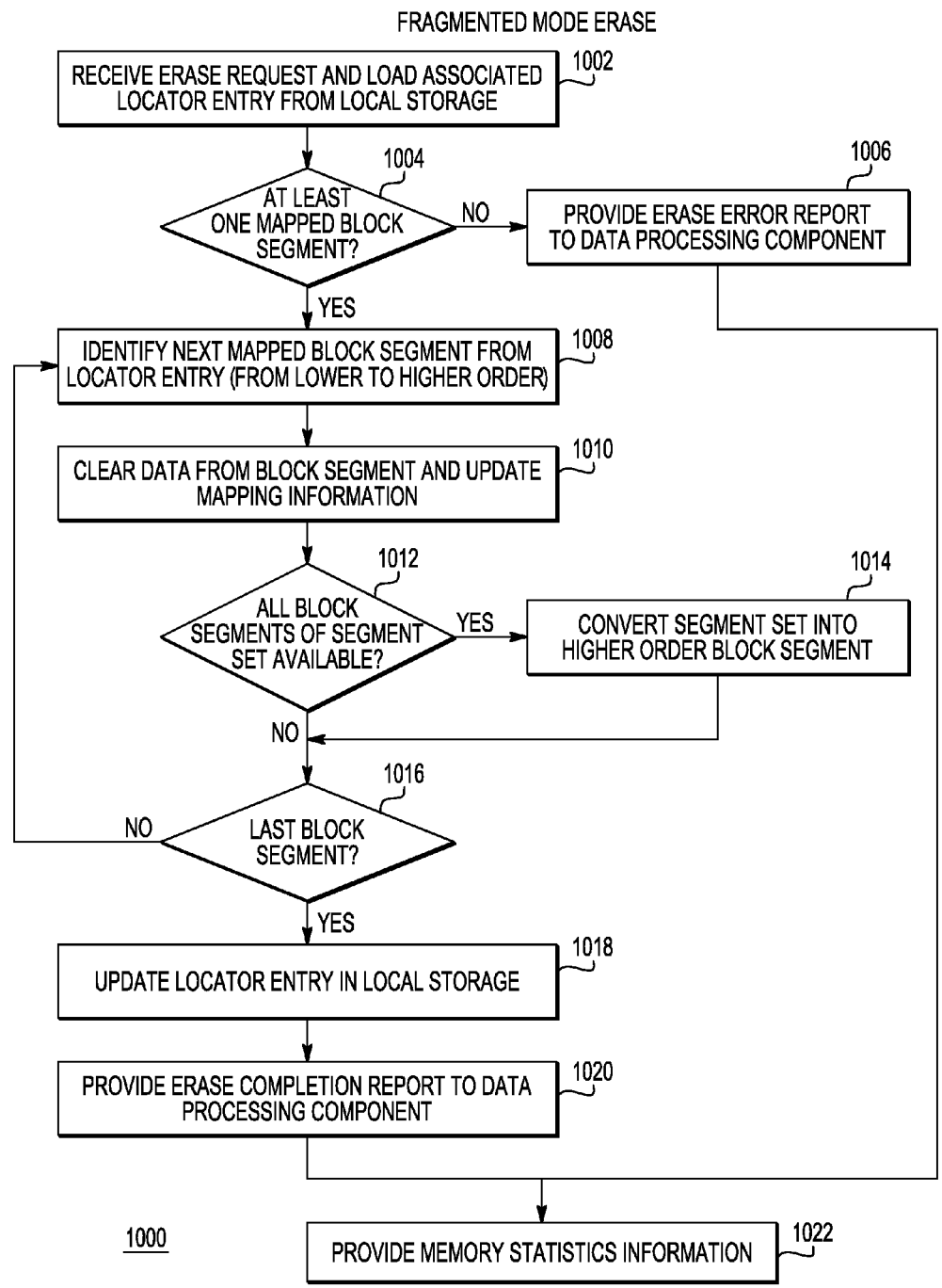
FIG. 10 is a flow diagram illustrating a method for erasing a data unit from a memory of the data processing device of FIG. 1 based on a fragmented modeling of the memory in accordance with at least one embodiment of the present disclosure.

FIGS. 8, 9, and 10 illustrate example methods for a write operation, a read operation, and an erase operation, respectively, for the memory controller 106 when the hardware controller 110 is operating in a fragmented mode that implements the fragmented model 202 (FIG. 2). For ease of illustration, the methods of FIGS. 8-10 are described in the context of the example implementation of FIG. 7. Further, although certain processes are depicted and described in a certain sequence in FIGS. 8-10 for ease of illustration, it will be appreciated that these processes can be performed in parallel or in different orders than those illustrated except where expressly indicated.

The write method 800 of FIG. 8 initiates at block 802 whereby the data processing component 102 determines a select data unit (e.g., a data file) to be stored at the memory 104 and signals a write request to the memory controller 106. In one embodiment, the data processing component 102 may have previously identified a particular locator to be associated with the select data unit and the write request further can include an indicator of this identified locator. Alternatively, if the data processing component 102 has not yet specified a particular locator, the hardware controller 110 scans the locator map table 130 to identify and select a locator entry available for association with the data unit and then associates the selected locator entry with the data unit. Alternatively, the write request may be a write-reserve request as discussed above with respect to FIG. 4.

At block 804, the data processing component 102 then initiates transfer of the data unit as data information 128 to the data interface 118 of the memory controller 106. The data being transferred is buffered in the buffer interface 120. Once the buffer is filled or the write transfer has finished, at block 806 the hardware controller 110 identifies the particular combination of quanta that will be used to store the buffered data portion. To illustrate, assume for example that the buffered data portion has a size 1001011(b) and the memory 104 is partitioned based on a initial fragmenting of a block of at least quantum-7. In this example, the binary representation of the size of the buffered data portion allows the hardware controller 110 to identify the quanta needed based on whether there is a "1" or a "0" at the corresponding bit position. Thus, for the size 1001011(b), the data portion will need one quantum-6 block segment, one quantum-3 block segment, one quantum-1 block segment, and one quantum-0 block segment.

After determining the combination of quanta needed to store the buffered data portion, at block 808 the hardware controller 110 selects a quantum X from the combination of quanta (typically starting from the highest-order to the lowest order) and searches for an available block segment of at least quantum X. As discussed above, the hardware controller 110 can use local copies of the global fragmented usage value stored in the locator map table 730 and the quantum mapping information stored in the information block segment(s) of the memory 104 to identify an available quantum-X block segment. While searching for an available block segment of quantum-X, the hardware controller 110 further may note any available block segments of a higher quantum found while searching the memory 104 for a block segment of quantum-X in the event that an available block of quantum-X is not found and fragmentation of a higher-order block segment is necessary to provide an available block segment of the corresponding quantum.

At block 810 the hardware controller 110 determines whether a block segment of quantum-X has been found. If so, at block 812 the hardware controller 110 maps the identified block segment as a specific field inside a locator fragmented usage value set corresponding to the locator associated with the data unit and transfers a sub-portion of the data portion with the corresponding size to the identified block segment for storage. Further, the hardware controller 110 notes that this block segment is mapped by modifying the bit value at the corresponding bit position of the quantum mapping information of the corresponding segment sets to reflect the mapped status of the block segment.

Returning to block 810, in the event that a block segment of quantum-X is not available, the hardware controller 110 determines whether a block segment of a higher-quantum or order is available at block 814. As noted above, the hardware controller 110 can note any higher-order available block segments while searching for an available block segment of quantum-X. If no higher-order block segment is available, at block 815 the memory controller 106 generates a write error report and transmits the write error report to the data processing component 102 that issued the write request. Otherwise, if there is a higher-order block segment available, at block 816 the hardware controller 110 selects an available higher-order block segment that is closest in size to the quantum-X (e.g., selects a quantum-4 block segment (if available) when a quantum-3 block segment is needed but not available) and fragments the selected higher-order block segment to generate a corresponding segment set using the process described above. As the fragmentation of a block segment having a quantum higher than quantum X will result in a segment set having the quantum-X block segment, a quantum-(X−1) block segment, and so forth down to a block segment of quantum-0, at block 818 the hardware controller 110 maps not only the quantum-X block segment from the resulting segment set as well all other quanta needed to store remaining data from data portion and stores the corresponding sub-portion of the data portion to the mapped quanta block segments. The hardware controller 110 further modifies the relevant mapping information to reflect both the fragmentation of the higher-order block segment as well as the mapping of quanta block segments of the resulting segment set.

After mapping the selected sub-portion of the data portion to a corresponding block segment, at block 820 the hardware controller 110 determines whether the entire buffered data unit has been stored in the memory 104. If not, the hardware controller 110 selects the next quantum of the buffered data unit/quantum X from the combination of quanta determined at block 806 and then repeats the process or identifying an available block segment of quantum X (or fragmenting a higher-order block segment), mapping the block segment to the locator, and then storing that data quantum as represented by blocks 808, 810, 812, 814, 816, and 818.

At block 822, the hardware controller 110 updates the global fragmented usage value and the locator entry of the locator map table 730 by storing the updated local copies to the corresponding fields of the local storage component 112. Upon verification that both the data unit was correctly stored in the memory 104 and mapping information was correctly stored in the local storage component 112, at block 824 the hardware controller 110 generates a write completion report and provides the write completion report as report information 126 via the report interface 116 to the data processing component 102 that was the source of the write request. Further, at block 826 the memory controller 106 can provide memory statistics information to the data processing component 102 via the report interface following the write completion report (block 824) or the write error report (block 815).

The read method 900 of FIG. 9 initiates at block 902 whereby the data processing component 102 determines a select data unit to be read from the memory 104 and signals a read request to the memory controller 106. The read request includes the locator ID of the data unit determined when the data unit was stored to the memory 104 (using the write operation described in FIG. 8). The hardware controller 110 uses the locator ID to access the corresponding locator entry from the locator map table 730 and loads a local copy of the locator entry and a local copy of the global fragmented usage value from the locator map table 730.

At block 904, the hardware controller 110 uses the local copy of the locator fragmented usage value set from the locator entry to identify those quanta/block segments mapped to the locator entry. In the event that the hardware controller 110 is unable to identify any block segments mapped to the locator entry, the memory controller 106 will be unable to read any data for the locator ID provided and thus at block 906 the memory controller 106 provides a read error report to the data processing component 102.

Otherwise, if the locator fragmented usage value set indicates at least one block segment is mapped to the locator entry, at block 908 the hardware controller 110 identifies and accesses the first mapped block segment using the locator fragmented usage value set and at block 912 the data sub-portion stored in the first mapped block segment is transferred to the buffer interface 120 for output to the data processing component 102. The process represented by blocks 908 and 910 is repeated for the next mapped block segment and each mapped block segment thereafter until the last mapped block segment has been determined to have been accessed and read at block 912. In one embodiment, each accessed data sub-portion is buffered in the buffer interface 120 and then transmitted together as a data portion of the data unit (or as the entire data unit) to the data processing component 102 via the data interface 118 once the buffer interface 120 becomes full.

Upon verification that both the data unit was correctly and fully read from the memory 104, at block 914 the hardware controller 110 generates a read completion report and provides the read completion report as report information 126 via the report interface 116 to the data processing component 102 that was the source of the read request. Further, at block 916 the memory controller 106 can provide memory statistics information to the data processing component 102 via the report interface following the read completion report (block 914) or the read error report (block 906).

As an illustration of the read operation using the example implementation of FIG. 7, assume that a read request to read the data unit associated with locator entry LE2 is received by the hardware controller 110. Accordingly, the hardware controller 110 accesses the locator entry LE2 (locator entry 336) and analyzes the locator fragment usage values ("0100" and "0010") stored therein to identify quantum-2 and quantum-1 from the original memory block as storing data of the data unit. In this example, quantum-2 and quantum-1 block segments are not further fragmented. Thus, the hardware controller 110 then accesses the data stored at the block segment 714 (quantum-2) and the block segment 713 (quantum-1) in the proper sequence and outputs the resulting data unit as described above.

The hardware controller 110 further can implement write-map requests and write-modify requests in the fragmented model 202 by adapting the write method 800 and the read method 900 described above. To illustrate, a write-map request can be performed by mapping the block segments to a data unit as described in the write method 800 without transferring any data at that point to the mapped block segments. For a write-modify request, the block segments already allocated to data unit can be identified and accessed in accordance with the process described in the read method 900 and then the new data written to the identified block segments using the write process described in the write method 900.

The erase method 1000 of FIG. 10 initiates at block 1002 whereby the data processing component 102 determines a select data unit to be erased from the memory 104 and signals an erase request to the memory controller 106. The erase request includes the locator ID of the data unit determined when the data unit was stored to the memory 104 (using the write operation described in FIG. 8). In response to the erase request, the hardware controller 110 accesses the locator map table 330 and loads a local copy of the locator fragmented usage value set of the locator entry associated with the provided locator ID and loads a local copy of the global fragmented usage value.

At block 1004, the hardware controller 110 uses the local copy of the locator fragmented usage value set to identify those fragmented block segments/quanta mapped to the locator entry. In the event that the hardware controller 110 is unable to identify any fragmented block segments mapped to the locator entry, the memory controller 106 will be unable to erase any data for the locator ID provided and thus at block 1006 the memory controller 106 provides an erase error report to the data processing component 102.

Otherwise, if the locator fragmented usage value set indicates at least one block segment is mapped to the locator entry, at block 1008 the hardware controller 110 identifies and accesses the first mapped block segment (typically from lower order to higher order) and at block 1010 the hardware controller 110 clears or otherwise erases the data stored in the first mapped block segment if appropriate. Further, the hardware controller 110 modifies the mapping information to reflect the erasure of the data from the block segment by clearing the corresponding field in the local copies of the locator fragment usage value (e.g., by writing a "0" to corresponding bit positions), as well as by modifying the quantum mapping information stored in the base address block segments of the memory 104 and any segment set in which the block segment is found.

At block 1012, the hardware controller 110 determines whether the mapped block segment is part of a segment set, and if so, whether all of the block segments of the segment set are available (unmapped). If so, the hardware controller 110 converts the segment set back to a higher-order block segment and modifies either the global fragmented usage value or clears the bit position corresponding to block segment fragmentation value inside the quantum mapping information stored in the base address of the fragmented block (from which the block segment was created) to reflect this conversion. To illustrate, assume the hardware controller 110 determines that a quantum-2 segment set is entirely available after clearing the data from the quantum-0 block segment of the segment set (e.g., the quantum-1 block segment and the quantum-0 block segment are available). Accordingly, the hardware controller 110 can update the mapping information to combine the quantum-1 block segment, the quantum-0 block segment, and the quantum mapping information block segment (also of quantum-0) back into a single quantum-2 block segment that is then available for mapping (or fragmenting again). The process represented by blocks 1008, 1010, 1012, and 1014 is repeated for the next mapped block segment and each mapped block segment thereafter until the last mapped block segment has been determined to have been accessed and erased at block 1016.

At block 1018 the hardware controller 110 updates the locator entry in the locator map table 330 by writing the updated local copy of the locator fragmented usage value set to the locator entry (or by clearing the locator entry completely) and updates the global fragmented usage value in the locator map table 730 by writing the updated local copy of the global fragmented usage value to the locator map table 730. Upon verification that both the data unit was correctly erased the memory 104 and mapping information was correctly updated in the local storage component 112, at block 1020 the hardware controller 110 generates an erase completion report and provides the erase completion report as report information 126 via the report interface 116 to the data processing component 102 that was the source of the erase request. Further, at block 1022 the memory controller 106 can provide memory statistics information to the data processing component 102 via the report interface following the erase completion report (block 1020) or the erase error report (block 1006).

As an illustration of the erase operation of FIG. 10 in the context of the implementation of FIG. 7, assume that an erase request to clear the data unit associated with locator entry LE2 (locator entry 736) is received by the hardware controller 110. Accordingly, the hardware controller 110 clears the data stored in block segments 713 and 714 (mapped to the locator entry LE2 via the locator fragmented usage value sets "0100" and "0010") and then clears the locator fragmented usage value set stored at the locator entry 736 to reflect the demapping of the block segments previously mapped to the locator entry LE2. Thus, the locator fragmented usage value set values are changed from "0100" and "0010" to "0000" and "0000", respectively. Likewise, the value of the block segment map value in the quantum mapping information at block 711 is modified by writing a "0" to the bit positions corresponding to the block segments previously mapped to the locator entry LE2, thereby changing the value from "1111: 0000" to "1001:0000". As the overall memory block is unable to be defragmented because of quantum-0 and quantum-3 block segments are still mapped the global fragmented usage value remains set to "1".

Figure 11:
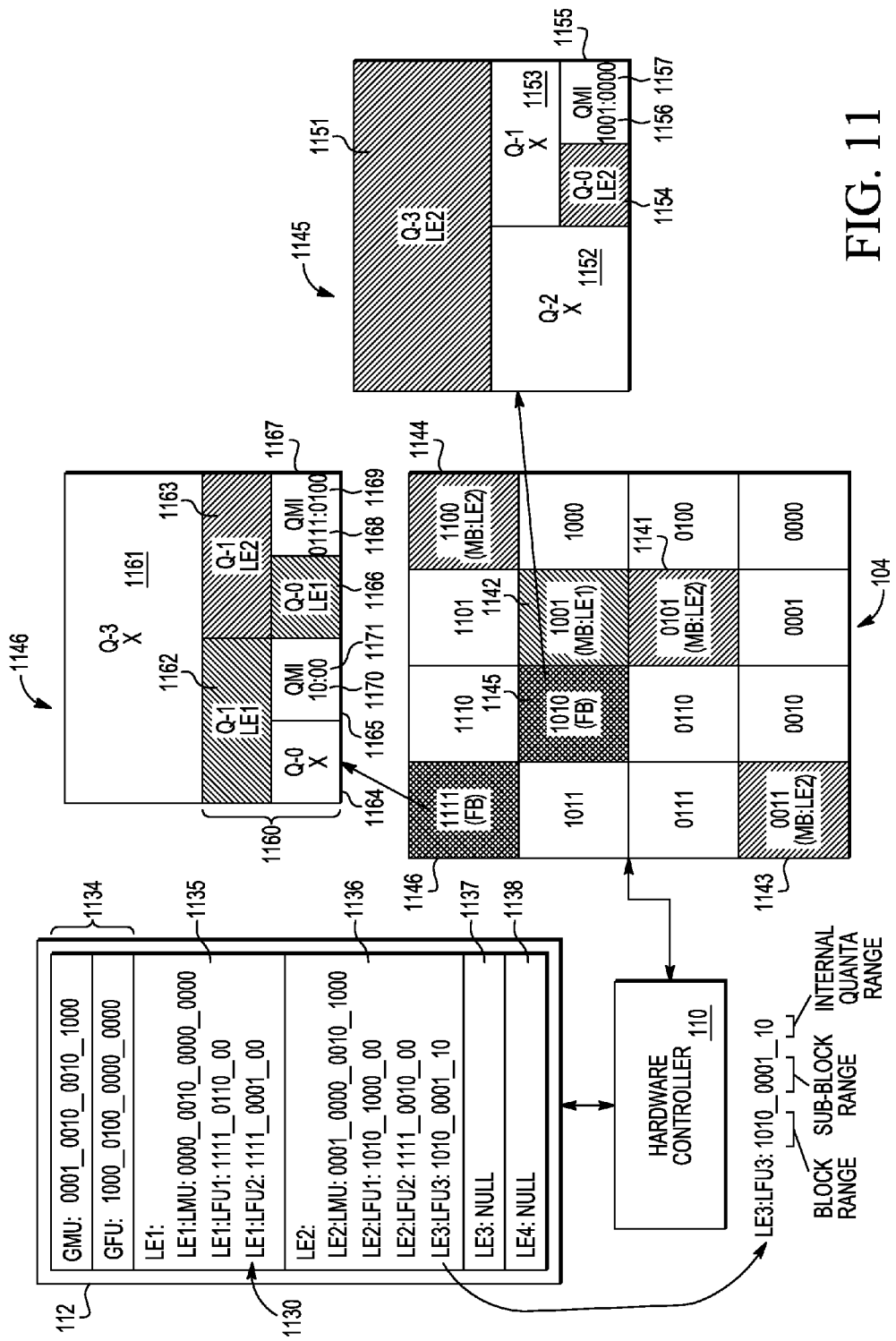
FIG. 11 is a diagram illustrating an example configuration of the data processing device of FIG. 1 for a combined monolithic and fragmented model of a memory in accordance with at least one embodiment of the present disclosure.

Referring to FIG. 11, an example implementation of the memory controller 106 using the combined model 203 (FIG. 2) is illustrated in accordance with at least one embodiment of the present disclosure. As noted above, for the combined model 203, the memory controller 110 partitions the memory 104 into a plurality of blocks with the same size (typically a power of 2), and which are aligned to external boundaries of the same size. In the illustrated example, the memory 104 is partitioned into sixteen (16) blocks. Further, in the example of FIG. 11 there are four locator entries 1135, 1136, 1137, and 1138 (also identified as locator entries 1, 2, 3, and 4 or LE1, LE2, LE3, and LE4) of the locator map table 1130 (corresponding to the locator map table 130) available for association with data units.

In the combined mode, the memory controller 106 initially arranges the memory 104 as a set of monolithic blocks. As operation progresses, one or more of these monolithic blocks may be converted a fragmented block to provide finer-grained storage for a data unit according to the fragmentation process described above. In particular, the memory controller 106 follows a fragmentation policy providing that when the hardware controller 110 would store a data portion with a size less than the size of the monolithic blocks, the hardware controller 110 will fragment an available monolithic block (using, e.g., the fractal fragmentation process described above) so as to generate a fragmented block with different order block segments available for mapping. The hardware controller 110 then can map just the block segments necessary to fit the original data portion. However, if the incoming data portion of a data unit has a size greater than the monolithic block size, the hardware controller 110 will map one or more monolithic blocks to corresponding sub-portions of the data portion and then either use the available block segments of an already-available fragmented block to store the remaining unmapped data of the data portion that did not fit into the mapped monolithic blocks, or the hardware controller 110 will initiate the fragmentation process for a new fragmented block if a fragmented block with sufficient available storage is not already available. Further, as noted above with respect to the write operation in the fragmented mode, the hardware controller 110 may fragment a higher-order block segment into a segment set of lower-order block segments in order to make available from the resulting segment set block segments corresponding to the quanta to be stored. Likewise, incoming data that does not reach the size corresponding of that monolithic order will instead be mapped to one or more block segments of one or more fragmented blocks.

Rather than use a single value to identify mapped blocks, the global mapping entry 1134 (corresponding to the global map entry 134, FIG. 1) stores both a global monolithic usage value (GMU) to identify which blocks of the plurality of blocks are mapped monolithic blocks and a global fragmented usage value (GFU) that identifies which blocks of the plurality of blocks have been converted to fragmented blocks. To allow identification of which monolithic blocks (if any) are mapped to a locator entry, the locator entry includes a locator monolithic usage (LMU) value that identifies the monolithic blocks mapped to the locator entry. In one embodiment, each bit position of the locator monolithic usage value corresponds to a corresponding block of the memory 104. To illustrate, as the memory 104 in the example of FIG. 11 is partitioned into sixteen blocks, the locator monolithic usage value of each locator entry has a sixteen-bit length.

To identify the block segments mapped to a locator entry, the locator entry further includes a locator fragmented usage (LFU) value for each block segment mapped locator entry. Each locator fragmented usage value set corresponds to a single order and identifies both the index of the corresponding fragmented block in which the block segment is found and also the internal offset of this quantum within fragmented block. To illustrate, the locator entry 1135 includes a locator fragmented usage value set of "1111_0110_00" (LE1: LFU1), whereby the first four bits ("1111") identifies the block index of fragmented block which contains the corresponding block segment, the last two bits ("00") identify that the full block segment was used (in the event that the block segment is of the lower order possible and data portion does not use the full block segment at all), and the intermediate four bits has two fields on them: the first "1" and all bits to the right of this bit identify the quantum value (as represented by "_XX10_") and all bits left to this bit identifies the path inside the fragmented block to access the mapped block segment (as represented by "01XX"). Thus, the locator fragmented usage value set of "1111_0110_00" (LE1:LFU1) points to the block segment 1162 (of quantum-1) of the fragmented block 1160 (quantum-2) of the fragmented block 1146. As other example, the locator entry 1136 includes a locator fragmented usage value set of "1010_0001_10" (LE2:LFU3), whereby the first four bits ("1010") identifies the block index of fragmented block which contains the corresponding block segment, the last two bits ("10") identify part of the least order quantum used by data portion, and the intermediate four bits identify both the quanta value (as represented by least significant bit "1" and bits to the right of the four bits) and the path inside the fragmented block to access the mapped block segment (as represented by the three upper bits "000X"). Thus, the locator fragmented usage value set of "1010_0001_10" (LE2:LFU3) points to the block segment 1154 (of quantum-0) of the fragmented block 1145.

In the example of FIG. 11, block "1001" (block 1142) has been mapped as a monolithic block to locator entry 1 (LE1), blocks "0011", "0101", and "1100" (blocks 1143, 1141, and 1144, respectively) have been mapped as monolithic blocks to locator entry 2 (LE2), and blocks "1010" and "1111" (blocks 1145 and 1146, respectively) have been converted to fragmented blocks, each having block segments mapped to locator entry 1 and locator entry 2. For ease of identification, those blocks/block segments mapped to the locator entry 1 are shaded with a forward-slanting hash, those block/block segments mapped to the locator entry 2 are shaded with a rear-slanting hash, and those fragmented blocks having block segments mapped to both the locator entry 1 and the locator entry 2 are shaded with cross-hatching.

Also in the depicted example, the hardware controller 110 has converted a monolithic block at position "1010" into a fragmented block 1145 with a fragment order of 4 (i.e., in a strict geometric division of the fourth order) so that the fragmented block 1145 has a block segment 1151 of quantum-3, a block segment 1152 of quantum-2, a block segment 1153 of quantum-1, and block segment 1154 of quantum-0, and whereby the block segment 1155 at the most base address of the fragmented block is utilized as an information block segment to store the quantum mapping information for the fragmented block 1145, including a block segment map value 1156 and a block segment fragmentation value 1157 (combined as "1001:0000"), whereby each bit position of the four bits of the block segment map value 1156 identifies the mapped/unmapped status of the corresponding one of the four block segments of the fragmented block 1145 and each bit of the four bits of the block segment fragmentation value 1157 identifies the fragmented status of the corresponding one of the four block segments of the fragmented block 1145. In this example, the block segments 1151 and 1154 are mapped to the locator entry 2 and the block segments 1152 and 1153 are unmapped and thus available for association with other data units. Accordingly, the block segment map value 1156 is set to "1001" to reflect this mapping. None of the block segments 1151-1154 are further fragmented, and thus the block segment fragmentation value 1157 is set to "0000".

The hardware controller 110 has fragmented the block 1146 such that the fragmented block 1146 has a block segment 1161 of quantum-3, a block segment 1163 of quantum-1, and a block segment 1166 of quantum-0. A quantum-2 block segment 1160 resulting from first level fragmentation is further fragmented in accordance with the same fractal fragmentation process, resulting in a quantum-2 segment set comprising a block segment 1162 of quantum-1, a block segment 1164 of quantum-0, and a block segment 1165 to store the quantum mapping information for the quantum-2 segment set, including a block segment map value 1170 of "10" (thereby indicating that the quantum-1 block segment of the segment set is mapped) and a block segment fragmentation value 1171 (thereby indicating that none of the block segments of the segment set have been further fragmented). The block segment 1167 at the most base address of the fragmented block 1146 is used to store the quantum mapping information for the fragmented block 1146, including a block segment map value 1168 of "0111", thereby identifying the quantum-3 (block segment 1161) of the fragmented block 1146 as available and the quanta-2, 1, and 1 as at least partially mapped. The block segment information further includes a block segment fragmentation value 1169 of "0100" that identifies that the quantum-2 (block segment 1160) has been further fragmented, so that the resulting segment set of quantum-1 and 0 block segments (the block segments 1162 and 1164) have been created.

In the illustrated example, block segments 1162 and 1166 are mapped to locator entry 1, block segment 1163 is mapped to locator entry 2, and block segments 1161 and 1164 are available for mapping. As a result of the illustrated mapping and illustrated fragmentation of blocks, the global monolithic usage (GMU) value is set to "0001_0010_0010_1000" and the global fragmented usage (GFU) value is set to "1000_0100_0000_0000". The locator entry 1135 (locator entry 1) includes a locator monolithic usage value (LE1:LMU) of "0000_0010_0000_0000" to identify block "1001" (block 1142) as being a monolithic block mapped to the locator entry 1135. The locator entry 1135 further includes a first locator fragmented usage value set (LE1:LFU1) of "1111_0110_00" to identify block segment 1162 at offset "01XX" within the quantum-1 block segment "XX10" inside fragmented block "1111" (fragmented block 1146) as mapped to the locator entry 1; and a second locator fragmented usage value set (LE1:LFU2) of "1111_0001_00" to identify block segment 1166 as offset "_000X_" for the quantum-0 block segment ("XXX1") inside the same block segment "1111" (fragmented block 1146) mapped to the same locator entry 1. The locator entry 1136 (locator entry 2) includes a locator monolithic usage value (LE2:LMU) of "0001_0000_0010_1000" to identify monolithic blocks "0011" (block 1143), "0101" (block 1141), and "1100" (block 1144) as being mapped to the locator entry 1136. The locator entry 1136 further includes a first locator fragmented usage value set (LE2:LFU1) of "1010_1000_00" to identify block segment 1151 with no offset for the quantum-3 block segment ("1000") inside the fragmented block "1010" (fragmented block 1145) as mapped to the locator entry 1136; a second locator fragmented usage value set (LE2:LFU2) of "1111_0010_00" to identify block segment 1163 with offset "_00XX_" for the quantum-1 block segment "XX10" inside fragmented block "1111" (fragmented block 1146) as mapped to the locator entry 1136; and a third locator fragmented usage value set (LE2:LFU3) of "1010_0001_10" to identify block segment 1154 with size "10" for the quantum-0 block segment "XXX1" with null offset "000X" inside fragmented block "1010" (fragmented block 1145) as mapped to the locator entry 1136.

Figure 12:
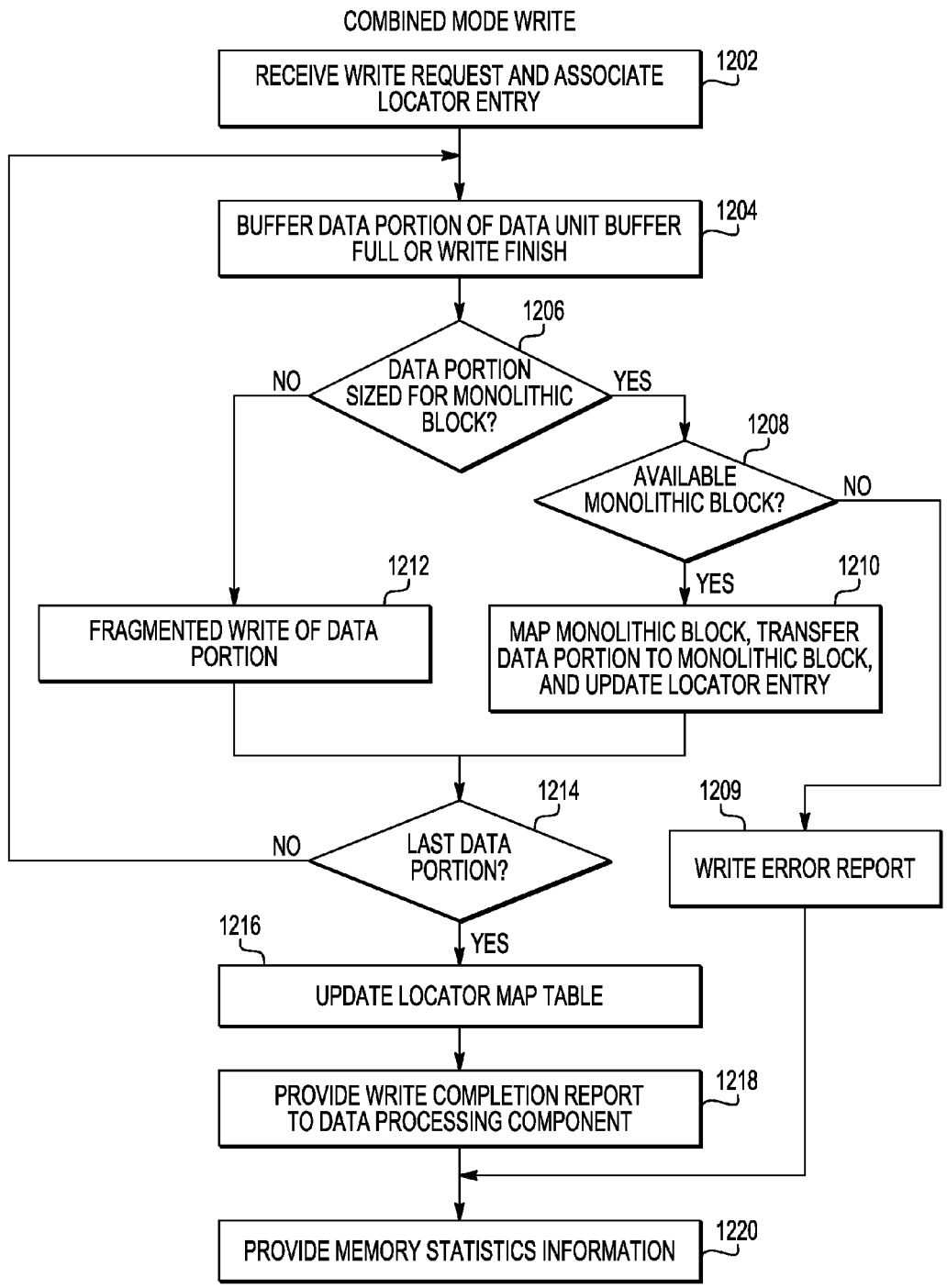
FIG. 12 is a flow diagram illustrating a method for writing a data unit to a memory of the data processing device of FIG. 1 based on a combined monolithic and fragmented modeling of the memory in accordance with at least one embodiment of the present disclosure.
Figure 13:
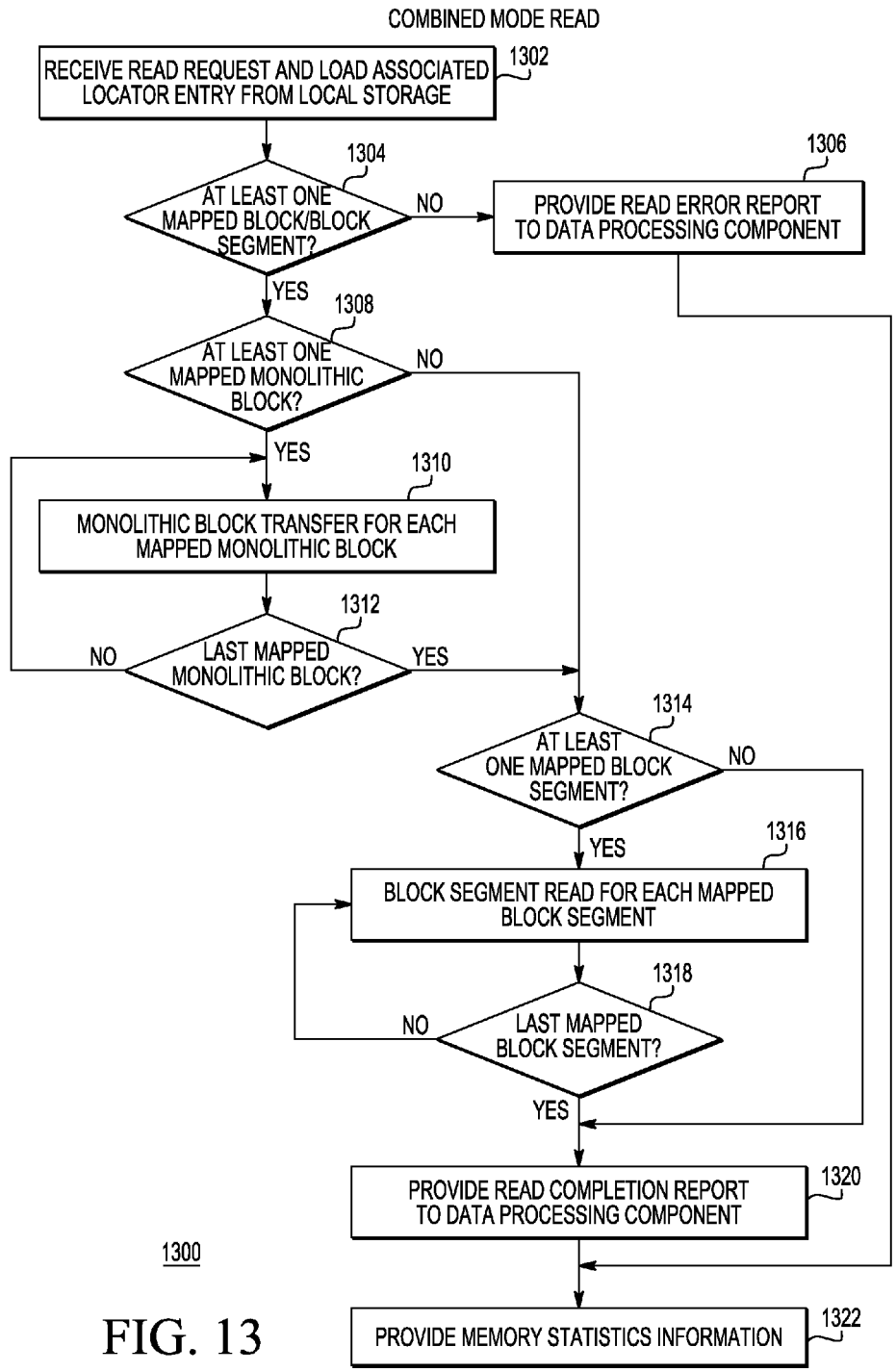
FIG. 13 is a flow diagram illustrating a method for reading a data unit from a memory of the data processing device of FIG. 1 based on a combined monolithic and fragmented modeling of the memory in accordance with at least one embodiment of the present disclosure.
Figure 14:
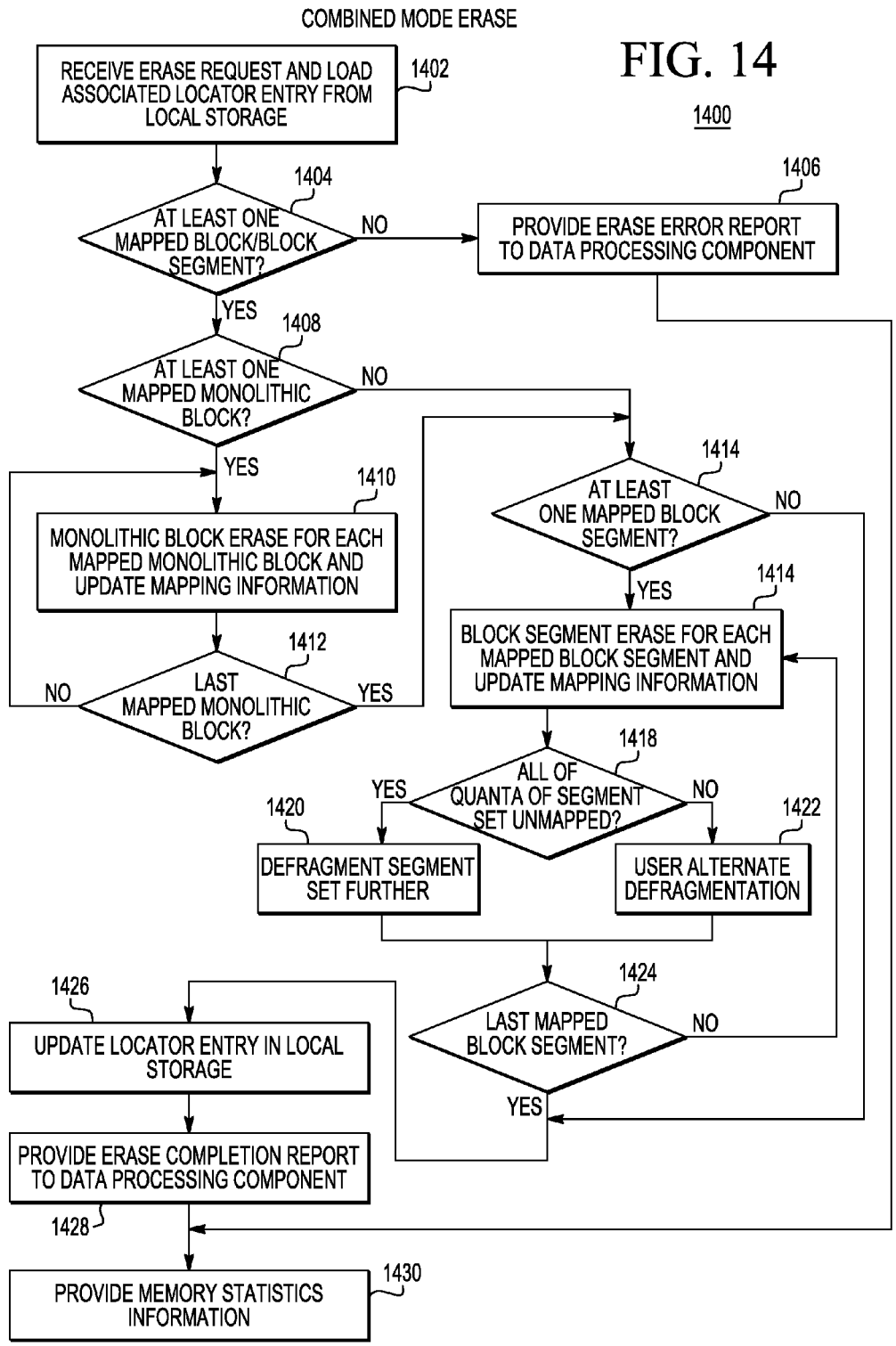
FIG. 14 is a flow diagram illustrating a method for erasing a data unit from a memory of the data processing device of FIG. 1 based on a combined monolithic and fragmented modeling of the memory in accordance with at least one embodiment of the present disclosure.

FIGS. 12, 13, and 14 illustrate example methods for a write operation, a read operation, and an erase operation, respectively, for the memory controller 106 when the hardware controller 110 is operating in a combined mode that implements the combined model 203 (FIG. 2). For ease of illustration, the methods of FIGS. 12-14 are described in the context of the example implementation of FIG. 11. Further, although certain processes are depicted and described in a certain sequence in FIGS. 12-14 for ease of illustration, it will be appreciated that these processes can be performed in parallel or in different orders than those illustrated except where expressly indicated.

The write method 1200 of FIG. 12 initiates at block 1202 whereby the data processing component 102 determines a select data unit (e.g., a data file) to be stored at the memory 104 and signals a write request to the memory controller 106 and the hardware controller 110 accesses the locator entry associated with the write request (using a locator ID either provided by the data processing component or identifying some available locator ID). The hardware controller 110 then creates a local copy of the global monolithic usage value, the global fragmented usage value, and the value(s) of the locator entry.

At block 1204, the data processing component 102 initiates transfer of the data unit as data information 128 to the data interface 118 of the memory controller 106. The data being transferred is buffered in the buffer interface 120. Once the buffer interface 120 is filled or the write transfer has finished, at block 1206 the hardware controller 110 determines whether the buffered data portion is amenable to storage in a monolithic block (i.e., the buffered data is sized the same as a monolithic block). If so, at block 1208 the hardware controller 110 determines whether there is an available memory block in the memory 104 using the local copy of the global monolithic usage value using the search process described above with reference to the monolithic model 201. In the event that a monolithic block is available, at block 1210 the hardware controller 110 maps the identified monolithic block to the locator entry by modifying the relevant mapping information (e.g., by writing a "1" to the corresponding bit position in the local copies of the global monolithic usage value and the locator monolithic usage value) and transfers the buffered data portion to the identified monolithic block using the monolithic write operation described above with reference to FIG. 4. If no monolithic block is found, at block 1209 the memory controller 106 provides a write error report to the data processing component 102.

Otherwise, if the buffered data portion is not amenable to storage in a monolithic block (e.g., the buffered data portion is smaller than a monolithic block), at block 1212 the buffered data portion is stored to as many block segments as quanta in the size of the buffered data portion using the fragmented write operation described above with reference to FIG. 8. As discussed above, this process may include converting a monolithic block to a fragmented block or converting a block fragment to a segment set.

The process represented by blocks 1204, 1206, 1208, 1210, and 1212 is repeated for each incoming data portion until it is determined at block 1214 that the last data portion of the data unit has been stored in the memory. At block 1216, the hardware controller 110 updates the locator map table 1130 in the local storage component 112 by storing the updated local copies of the global monolithic usage value, the global fragmented usage value, and the values of the locator entry to the corresponding fields of the local storage component 112. Upon verification that both the data unit was correctly stored in the memory 104 and mapping information was correctly stored in the local storage component 112, at block 1218 the hardware controller 110 generates a write completion report and provides the write completion report as report information 126 via the report interface 116 to the data processing component 102 that was the source of the write request. Further, at block 1220 the memory controller 106 can provide memory statistics information to the data processing component 102 via the report interface following the write completion report (block 1218) or a write error report (which may be generated through the process represented by block 1209).

The read method 1300 of FIG. 13 initiates at block 1302 whereby the data processing component 102 determines a select data unit (e.g., a data file) to be read from the memory 104 and signals a read request to the memory controller 106 and the hardware controller 110 accesses the locator entry associated with the read request. The hardware controller 110 then creates a local copy of the global monolithic usage value, the global fragmented usage value, and the value(s) of the locator entry.

At block 1304, the hardware controller 110 uses the local copies of the mapping values from the locator entry to determine whether any monolithic blocks or block segments are mapped to the locator entry. In the event that the hardware controller 110 is unable to identify any blocks or block segments mapped to the locator entry, the memory controller 106 will be unable to read any data for the locator ID provided and thus at block 1306 the memory controller 106 provides a read error report to the data processing component 102.

Otherwise, if the values of the locator entry indicate at least one block or block segment is mapped to the locator entry, at block 1308 the hardware controller 110 determines whether a monolithic block is mapped to the locator entry. If so, at block 1310 the hardware controller 110 uses the locator monolithic usage value of the locator entry to identify the first monolithic block mapped to the locator entry and access the data stored at the monolithic block for transfer the data processing component 102. This process is repeated for each monolithic block mapped to the locator entry until the hardware controller 110 determines at block 1312 that all monolithic blocks mapped to the locator entry have been read out. Once all monolithic blocks have been accessed (or if it is determined at block 1308 there are no monolithic blocks mapped to the locator entry), at block 1314 the hardware controller 110 uses the locator fragmented usage value set(s) stored in the locator entry to determine whether any block fragments are mapped to the locator entry. If so, at block 1316 each mapped block fragment is identified and the data stored in the block fragment is transferred to the data processing component 102 in accordance with the fragmented read access operation described above with reference to FIG. 9. This process is repeated until the hardware controller 110 determines at block 1318 that the last block fragment mapped to the locator entry has been accessed and read out.

Upon verification that both the data unit was correctly and fully read from the memory 104, at block 1320 the hardware controller 110 generates a read completion report and provides the read completion report as report information 126 via the report interface 116 to the data processing component 102 that was the source of the read request. Further, at block 1322 the memory controller 106 can provide memory statistics information to the data processing component 102 via the report interface following the read completion report (block 1320) or a read error report (which may be generated through the process represented by block 1306).

The hardware controller 110 further can implement write-map requests and write-modify requests in the combined model 203 by adapting the write method 1200 and the read method 1300 described above. To illustrate, a write-map request can be performed by mapping the block segments to a data unit as described in the write method 1200 without transferring any data at that point to the mapped block segments. For a write-modify request, the block segments already mapped to data unit can be identified and accessed in accordance with the process described in the read method 1300 and then the new data written to the identified block segments using the write process described in the write method 1200.

The erase method 1400 of FIG. 14 initiates at block 1402 whereby the data processing component 102 determines a select data unit (e.g., a data file) to be erased from the memory 104 and signals an erase request to the memory controller 106 and the hardware controller 110 accesses the locator entry associated with the erase request. The hardware controller 110 then creates a local copy of the global monolithic usage value, the global fragmented usage value, and the value(s) of the locator entry.

At block 1404, the hardware controller 110 uses the local copies of the mapping values from the locator entry to determine whether any monolithic blocks or block segments are mapped to the locator entry. In the event that the hardware controller 110 is unable to identify any blocks or block segments mapped to the locator entry, the memory controller 106 will be unable to erase any data for the locator ID provided and thus at block 1406 the memory controller 106 provides an erase error report to the data processing component 102.

Otherwise, if the values of the locator entry indicate at least one block or block segment is mapped to the locator entry, at block 1408 the hardware controller 110 determines whether a monolithic block is mapped to the locator entry. If so, at block 1410 the hardware controller 110 uses the locator monolithic usage value of the locator entry to identify the first monolithic block mapped to the locator entry and erase the data stored at the monolithic block for transfer the data processing component 102. Further, the hardware controller 110 modifies the mapping information to reflect the erasure of the data from the monolithic block and the demapping of the monolithic block by, for example, clearing the corresponding bit from the local copy of the global monolithic usage value and the local copy of the locator monolithic usage value. This process is repeated for each monolithic block mapped to the locator entry until the hardware controller 110 determines at block 1412 that all monolithic blocks mapped to the locator entry have been erased. Once all monolithic blocks have been erased and demapped (or if it is determined at block 1408 there are no monolithic blocks mapped to the locator entry), at block 1414 the hardware controller 110 uses the locator fragmented usage value set fields stored in the locator entry to determine whether any block fragments are mapped to the locator entry. If so, at block 1416 each mapped block fragment is identified, the data stored in the block fragment is erased, and the block fragment is demapped in accordance with the fragmented erase access operation described above with reference to FIG. 10.

At block 1418, the hardware controller 110 determines if the block segment being erased is part of segment set resulting from a prior fragmentation of a higher-order block fragment. If so, the hardware controller 110 further determines whether all of the block segment of the segment set are unmapped. If so, at block 1420 the hardware controller can defragment the segment set of quanta k−1 and lower to create a single block segment of quantum k as described above. Otherwise, if one or more of the block segments of the segment set remain mapped, at block 1422 the hardware controller 110 can implement other defragmentation methods, such as moving data from one block segment of the segment set to another block segment not in the segment set in an attempt to unmap all of the block segments of the segment set so that the segment set can be recombined into a single block segment of a higher order. The process of blocks 1416, 1418, 1420, and 1422 is repeated until the hardware controller 110 determines at block 1424 that the last block fragment mapped to any of the locator entries has been erased, demapped and defragmented.

At block 1426, the hardware controller 110 updates the locator map table 1130 in the local storage component 112 by storing the updated local copies of the global monolithic usage value, the global fragmented usage value, and the values of the locator entry to the corresponding fields of the local storage component 112. Upon verification that both the data unit was correctly erased from the memory 104 and the updated mapping information was correctly stored in the local storage component 112, at block 1428 the hardware controller 110 generates an erase completion report and provides the erase completion report as report information 126 via the report interface 116 to the data processing component 102 that was the source of the erase request. Further, at block 1430 the memory controller 106 can provide memory statistics information to the data processing component 102 via the report interface following the erase completion report (block 1428) or a write error report (block 1406).

The hardware controller 110 further can implement erase-data requests in the combined model 203 by adapting the erase method 1200 described above without the demapping function, such that just the date unit stored at memory 104 is erased but map information is still not touched at local storage, so that furthers write-modify may target the very same locator ID to which an erase-data request took place before.

Figure 15:
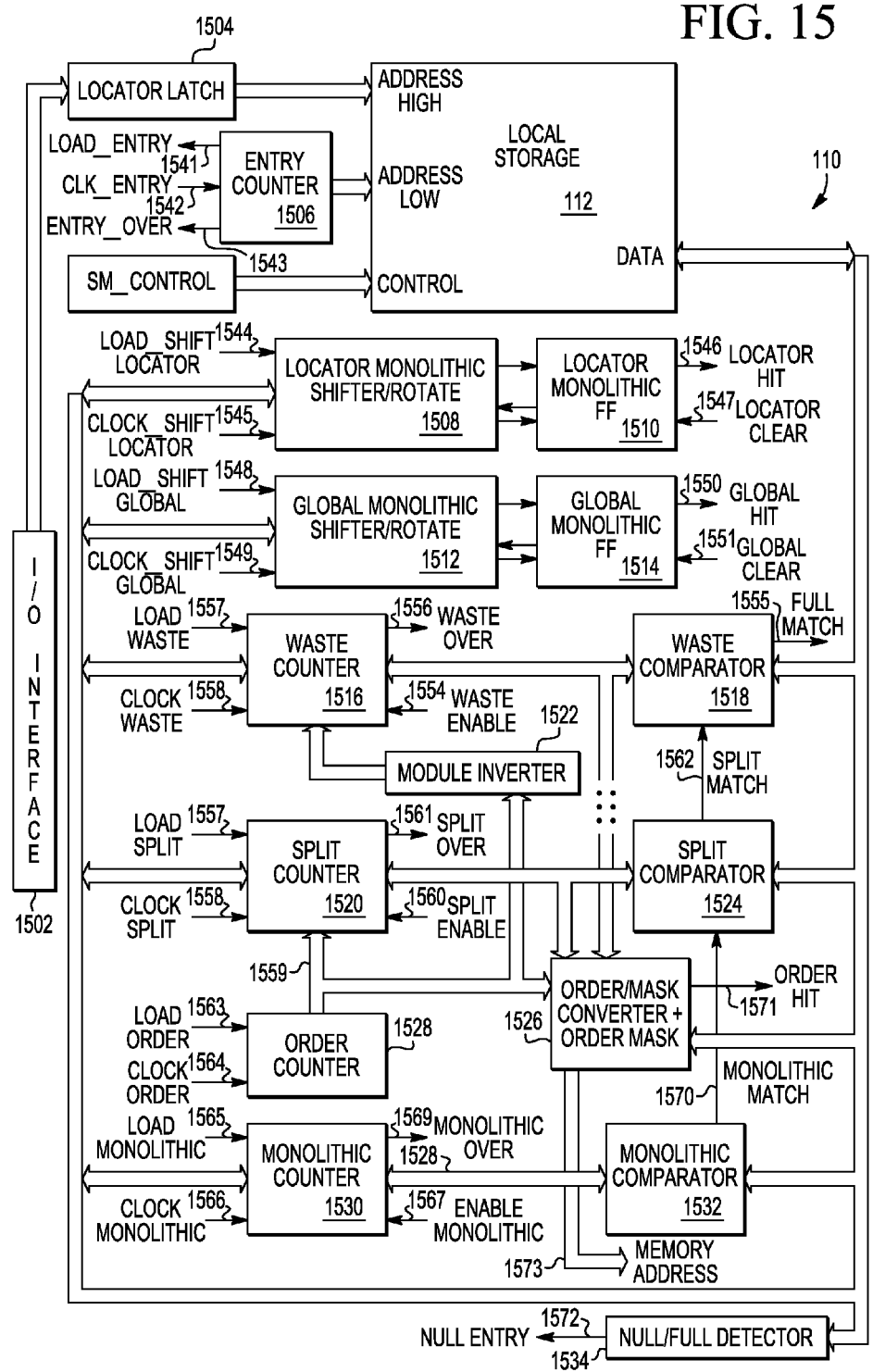
FIG. 15 is a diagram illustrating an example implementation of a hardware controller 110 of a memory controller of the data processing device of FIG. 1 in accordance with at least one embodiment of the present disclosure.

FIG. 15 illustrates an example implementation of the hardware controller 110 as a state machine in accordance with at least one embodiment of the present disclosure. In the depicted implementation, the hardware controller 110 includes a state machine (not illustrated) implementing a locator latch 1504 to latch an incoming locator value, an entry counter 1506 to step into each of the entries for a selected locator entry, a locator monolithic shifter/rotate module 1508, a locator monolithic flip flop (FF) 1510, a global monolithic shifter/rotate module 1512 and a global monolithic FF 1514, a waste counter 1516, a waste comparator 1518, a fragment counter 1520, a module inverter 1522, a fragment comparator 1524, an order/mask converter 1526, an order counter 1528, a monolithic counter 1530, a monolithic comparator 1532, and a full/null detector 1534. Table 1 provides a description of the signaling produced and used by these components and Table 2 provides a description of the operation of each component of the illustrated implementation.

TABLE 1

| Identifier | Name | Description |
| --- | --- | --- |
| 1541 | Load_Entry | restart Entry counter to the beginning of a Locator Entry |
| 1542 | Clk_Entry | increment Entry counter to next offset |
| 1543 | Entry_Over | Signals Entry counter is over |
| 1544 | Load_Shift Locator | loads a locator map into Locator Monolithic shift/rotate register set |
| 1545 | Clock_Shift Locator | shifts/rotates locator map value |
| 1546 | Locator HIT | block currently selected by current locator map; indicates the block contains a data portion corresponding to the loaded locator monolithic map loaded |
| 1547 | Locator Clear | clear registers into locator monolithic shift/rotate register set |
| 1548 | Load_Shift Global | loads a value into global monolithic shift/rotate register set |
| 1549 | Clock_Shift Global | shifts/rotates global monolithic shift/rotate register set |
| 1550 | Global HIT | block selected by global map is at least partially mapped |
| 1551 | Global Clear | clear registers into global monolithic shift/rotate register set |
| 1516 | Waste Counter | counter that scans partially/fully the proper block/sub-order block addressing each of the data words within |
| 1552 | Load Waste | loads a value into Waste counter. This value comes from some locator entry into local storage |
| 1553 | Clock Waste | increments/decrements waste counter. |
| 1554 | Waste Enable | enable Waste counter at Clock Waste proper edge |
| 1555 | Full Match | last stage of a triple comparator (monolithic plus block segment + waste) |
| 1556 | Waste Over | Waste Counter has reached its limit. |
| 1520 | Fragment Counter | this counter may have 2 functions: for monolithic model it is used in combination with Waste Counter to index full monolithic block contents. In fragment model it is programmable counter modulus-N where N will sweep into the full Fragment range |
| 1557 | Load Fragment | loads a value into Fragment counter; this value may come from one of two distinct sources: local storage or sub-order sweeper |

TABLE 1-continued

| Identifier | Name | Description |
|---|---|---|
| 1558 | Clock Fragment | increment/decrement Fragment counter |
| 1559 | Order Value | a second load value option for Fragment counter during sub-order sweeping -typically sweeps into full fragment order range |
| 1560 | Fragment Enable | enable fragment counter at Clock Fragment proper edge. |
| 1561 | Fragment Over | fragment counter has stepped over each of the order values inside fragment order range |
| 1562 | Fragment Match | indicates the current order fits for current data unit block being scanned |
| 1563 | LoadOrder | loads sweeper into its limit, normally to restart a new sweep |
| 1564 | Clock Order | sweeps the fragment order |
| 1565 | Load Monolithic | loads monolithic index |
| 1566 | Clock Monolithic | increment/decrement monolithic index |
| 1567 | Monolithic Enable | enable monolithic counter to count |
| 1568 | Monolithic Addr | monolithic part of the address |
| 1569 | Monolithic Over | indicates last monolithic index had been reached |
| 1570 | Monolithic Match | indicates monolithic block index matches monolithic bit position into the monolithic block map |
| 1571 | Order HIT | indicates a sub-order block had been reached |
| 1572 | Null Entry | indicates there is no entry left OR all of entries were hit already |
| 1573 | Memory Address | address to access storage. Depending on whether it is built-in: it goes directly to Memory block OR it is sent out through the Memory Interface. There are two output options: block address and block segment word address |
| 1591 | Waste Addr | waste part of the address |
| 1592 | Fragment Addr | fragment part of the address |
| 1593 | FIWselect | selects which address comes out from Order/Mask block: the base one (FIW contents) or current address for block scan |

TABLE 2

| Identifier | Name | Description |
|---|---|---|
| 1502 | I/O Interface | interface to interfaces 114 and 116 (FIG. 1) |
| 1504 | Locator Latch | latches incoming locator value |
| 1506 | Entry Counter | counter to step over each of the words for each of the locator entries |
| 1508 | Locator Monolithic Shifter/Rotate Module | A sequence off flip-flops corresponding to as many monolithic blocks are into the memory 104 |
| 1510 | Locator Monolithic FF | The last flip-flop of the previous sequence |
| 1512 | Global Monolithic Shifter/Rotate Module | a sequence of flip-flops corresponding to as many monolithic blocks are into the memory 104 |
| 1514 | Global FF | the last flip-flop of the previous sequence |
| 1516 | Waste Counter | counter for unmanaged size below fragment order |
| 1518 | Waste Comparator | comparator to match remaining size |
| 1520 | Fragment counter | counter to step into each of fragment pieces |
| 1522 | Module Inverter | inverts signal |
| 1524 | Fragment Comparator | comparator to match fragmented piece |
| 1526 | Order/Mask Converter | converts the order value into masks and isolates fields quantum order and block segment path inside fragmented block in order to output 2 addresses: block segment itself and base address of fragmented block |
| 1528 | Order Sweeper | a counter that sweeps through fragmented order range in order to look for each of its quanta |
| 1530 | Monolithic Counter | generates a monlithic index - most significant part of the memory address |
| 1532 | Monolithic Comparator | checks if the monolithic address is the one into current addressable entry |
| 1534 | Null/Full Detector | checks for full and null condition for every field inside entries |

Figure 16:
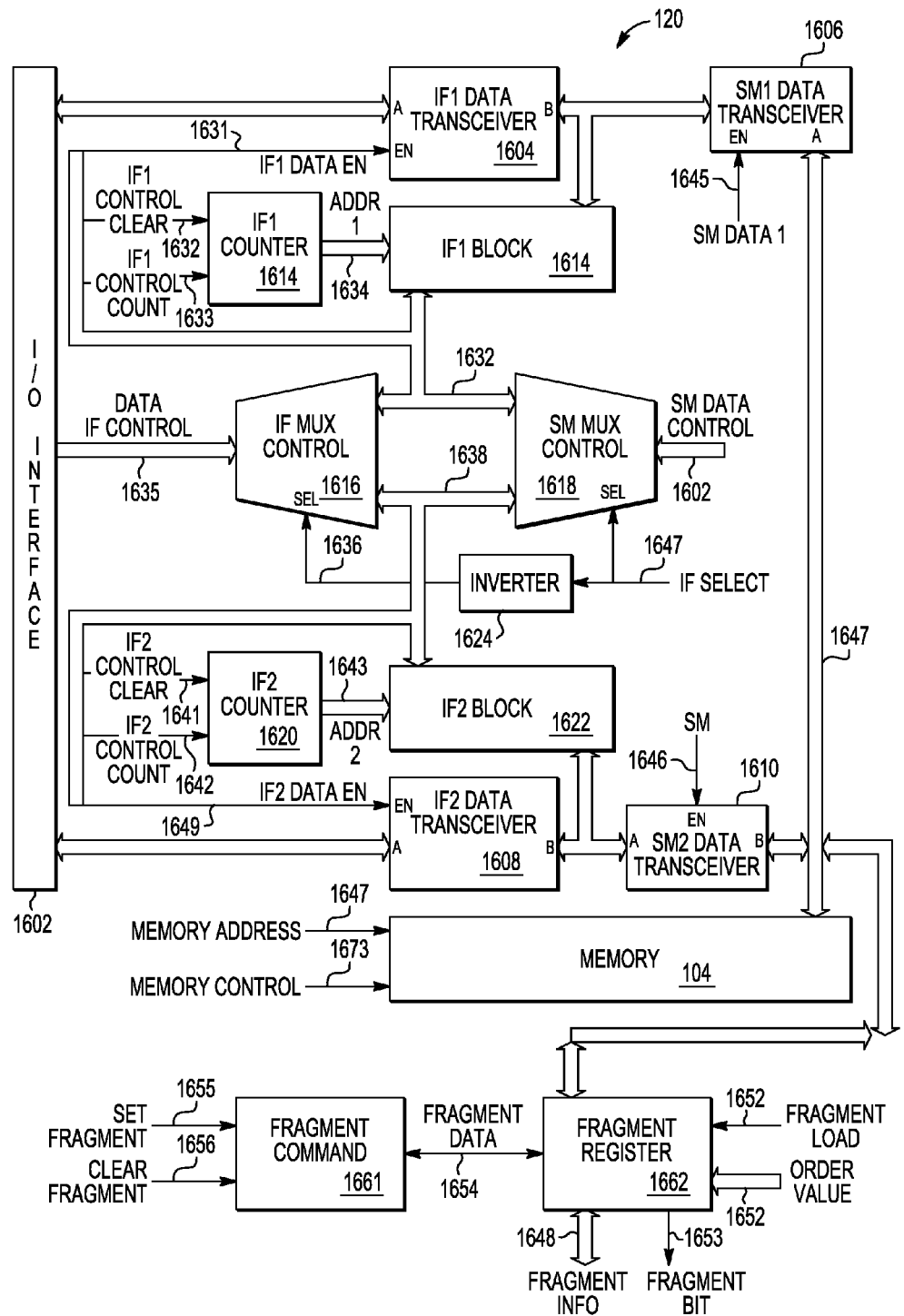
FIG. 16 is a diagram illustrating an example implementation of a memory interface of the memory controller of the data processing device of FIG. 1 in accordance with at least one embodiment of the present disclosure.

FIG. 16 illustrates an example implementation of the buffer interface 120 of the memory controller 106 of FIG. 1 for use with the implementation of the hardware controller 110 illustrated in FIG. 15 in accordance with at least one embodiment of the present disclosure. In the depicted example, the buffer interface 120 includes an I/O interface 1602, an interface-1 (IF1) data transceiver 1604, a state machine-1 (SM1) data transceiver 1606, an IF2 data transceiver 1608, an SM2 data transceiver 1610, an IF1 counter 1612, an IF1 monolithic block buffer 1614, an IF multiplexer 1616, a SM multiplexer 1618, an IF2 counter 1620, an IF2 monolithic block buffer 1622, an inverter 1624, a fragment command flip flop 1661, and a fragment register 1662. Table 3 provides a description of the signaling produced and used by these components and Table 4 provides a description of the operation of each component of the illustrated implementation.

TABLE 3

| Identifier | Name | Description |
|---|---|---|
| 1631 | IF1 Data en | Binds IF1 data bus with I/O Interface data bus |
| 1632 | IF1 Control Clear | restarts offset index for IF1 temporary memory block |
| 1633 | IF1 Control Count | counts offset index for IF1 temporary memory block |
| 1634 | Addr 1 | resulting index for IF1 temporary memory block |
| 1635 | IF data/control | I/O Interface Control/Data signal bus to access data on same of IF1/IF2 temporary memory |
| 1636 | \IF select | inverted select connection of I/O Interface to some of IF1/IF2 temporary memory and internal hardware controller 110 data/control bus to complementary IF2/IF1 temporary memory |
| 1637 | IF1 control/data bus | control signal bus to access data on IF1 temporary memory |
| 1638 | IF2 control/data bus | control signal bus to access data on IF2 |
| 1639 | HC data/control | hardware controller 110 Control/Data signal bus to access data on same of IF1/IF2 temporary memory |
| 1640 | IF select | select connection of I/O Interface to IF1/IF2 temporary memory and internal hardware controller 110 data/control bus to complementary IF2/IF1 temporary memory |
| 1641 | IF2 Control Clear | restart offset index for IF2 temporary memory block |
| 1642 | IF2 Control Count | count offset index for IF2 temporary memory block |
| 1643 | Addr 2 | resulting index for IF2 temporary memory block |
| 1644 | IF2 Data en | bind IF2 data bus with I/O Interface data bus |
| 1645 | SM Data 1 | bind IF1 data bus with hardware controller 110 data bus |
| 1646 | SM Data 2 | bind IF2 data bus with hardware controller 110 data bus |
| 1647 | Memory control | control bus to memory block 104 |
| 1648 | Fragment Info | block segment information to/from memory block 104 |
| 1651 | Fragment Load | loads block segment information into proper register |
| 1652 | Order Value | order value is being evaluated; comes from Order Sweeper |
| 1653 | Fragment Bit | indicates fragmentation for current memory address |
| 1654 | Fragment Data | fragment bit data to turn current addressed block fragmented or monolithic |
| 1655 | Set Fragment | turn on fragment bit command coming from hardware controller 110 |
| 1656 | Clear Fragment | turn off fragment bit command coming from hardware controller 110 |

TABLE 4

| Identifier | Name | Description |
|---|---|---|
| 1602 | I/O Interface | sum of Control + Data + Report interfaces |
| 1604 | IF1 Data Transceiver | bidirection data buffer for IF1 temporary memory with I/O Interface |
| 1606 | SM1 Data Transceiver | bidirection data buffer for IF1 temporary memory with Hardware controller 110 |
| 1608 | IF2 Data Transceiver | bidirection data buffer for IF2 temporary memory with I/O Interface |

TABLE 4-continued

| Identifier | Name | Description |
| --- | --- | --- |
| 1610 | SM2 Data Transceiver | bidirection data buffer for IF2 temporary memory with Hardware controller 110 |
| 1612 | IF1 Counter | index counter for IF1 temporary memory |
| 1614 | IF1 Block Buffer | first temporary memory to interface data between external user and memory 104 |
| 1616 | IF MUX | I/O Interface data/control mux among dual temporary memory blocks |
| 1618 | SM MUX | hardware controller 110 data/control mux among dual temporary memory blocks |
| 1620 | IF2 Counter | index counter for IF1 temporary memory |
| 1622 | IF2 Block Buffer | first temporary memory to interface data between external user and memory 104 |
| 1624 | Inverter | toggle IF select signal |
| 1661 | Fragment Command FF | flip-flop to store Fragment Command from hardware controller 110 |
| 1662 | Fragment Register | stores and processes both block information fields |

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method for mapping a memory, the method comprising:

logically partitioning, using a hardware controller, a portion of the memory having a size $2^k$, k being an integer number greater than one, into a first set of k block segments of different sizes such that a block segment i of the first set of k block segments has a size $2^i$ for i=0 to k−1, and a first mapping information block containing information identifying locations of the k block segments, the first mapping information block being of a size equal to a smallest block segment;

mapping, via the hardware controller, a first block segment of the first set of k block segments to a first data unit; and modifying a value stored at the first mapping information block to identify the first block segment as being mapped to a data unit.

2. The method of claim 1, further comprising:

modifying a global mapping value stored at a local storage component of the hardware controller to indicate the portion of the memory is partitioned into the first set of k block segments; and modifying a value at a first entry of a table stored at the local storage component to indicate at least one block segment of the portion of the memory is mapped to the first data unit.

3. The method of claim 2, wherein mapping the first block segment to the first data unit comprises:

identifying the first block segment for mapping to the first data unit based on a size of a first data portion of the first data unit.

4. The method of claim 2, further comprising:

receiving a first data portion of the first data unit and an identifier associated with the first entry at the hardware controller;

indexing, using the hardware controller, the first entry based on the identifier to access a value at the first entry;

identifying, using the hardware controller, the first block segment as mapped to the first data unit based on the value at the first entry; and storing the first data portion to the first block segment in response to identifying the first block segment.

5. The method of claim 2, further comprising:

receiving a request at the hardware controller, the request comprising one of an erase request to erase the first data unit from the memory or a read request to read the first data unit from the memory;

in response to the request:

indexing, using the hardware controller, the first entry based on the identifier to access the value at the first entry; and identifying, using the hardware controller, the first block segment as storing data of the first data unit based on the value at the first entry; and in response to the request comprising the erase request, modifying, using the hardware controller, the value at the first entry to indicate the first block segment is not mapped to any data unit.

6. The method of claim 5, further comprising:

responsive to the request comprising the erase request and responsive to determining that each block segment of the first set is not mapped to a data unit, logically combining each block segment of the first set into a single block segment having a size $2^k$ using the hardware controller.

7. The method of claim 1, further comprising:

mapping, via the hardware controller, a second block segment of the first set to the first data unit; and modifying the value stored at the first mapping information block to identify the second block segment of the first set as mapped to the first data unit.

8. The method of claim 1, further comprising:

in response to determining a select data portion of the first data unit has a size that is not equal to a size of any unmapped block segments of the first set:

logically partitioning, using the hardware controller, a second block segment of the first set having a size $2^j$ greater than the size of the select data portion into a second set of j block segments of different sizes such that a block segment i of the second set has a size $2^i$ for i=0 to j−1, and a second mapping information block containing information identifying locations of the block segments, the second mapping information block being of a size equal to a smallest block segment;

mapping a subset of block segments of the second set to the first data unit using the hardware controller, the subset of block segments of the second set having a collective size equal to the size of the select data portion;

modifying a value stored at the first mapping information block to identify the second block segment of the first set as being mapped to a data unit; and modifying a value stored at the second mapping information block to identify the subset of block segments of the second set as being mapped to a data unit.

9. The method of claim 8, further comprising:

in response to erasing the select data portion from the subset of block segments of the second set:

logically combining the second set of block segments back into the second block segment responsive to determining each block segment of the second set is not mapped to a data unit.

10. A memory controller comprising:

a memory interface to couple to a memory;

a data interface to couple to one or more data processing components; and a hardware controller coupled to the memory interface and the data interface, the hardware controller to logically partition a portion of the memory having a size $2^k$, k being an integer number greater than one, into a first set of k block segments of different sizes such that a block segment i of the first set of k block segments has a size $2^i$ for i=0 to k−1, and a first mapping information block containing information identifying locations of the k block segments, the first mapping information block being of a size equal to a smallest block segment, the hardware controller further to map a first block segment of the first set to a first data unit, and modify a value stored at the first mapping information block to identify the first block segment as being mapped to a data unit.

11. The memory controller of claim 10, further comprising:

a local storage component to store a global mapping value and a table; and wherein the hardware controller further is to modify the global mapping value to indicate the portion of the memory is partitioned into the first set and to modify a value at a first entry of the table to indicate at least one block segment of the portion of the memory is mapped to the first data unit.

12. The memory controller of claim 11, wherein:

the memory controller is to receive an erase request to erase the first data unit from the memory, the erase request comprising an identifier associated with the first entry; and in response to the erase request, the hardware controller is to index the first entry based on the identifier to access a value at the first entry, identify the first block segment as storing data of the first data unit based on the value at the first entry, and erase the first block segment in response to identifying the first block segment, and wherein the hardware controller further is to modify the value at the first entry to indicate the first block segment is not mapped to any data unit in response to erasing the first block segment.

13. The memory controller of claim 12, wherein the hardware controller further is to logically combine each block segment of the first set into a single block segment having a size $2^k$ responsive to determining that each block segment of the first set is not mapped to a data unit.

14. The memory controller of claim 11, wherein:

the memory controller is to receive a read request to read the first data unit from the memory, the read request comprising an identifier associated with the first entry; and in response to the read request, the hardware controller is to index the first entry based on the identifier to access the value at the first entry, identify the first block segment as storing data of the first data unit based on the value at the first entry, and read a data portion of the data unit from the first block segment in response to identifying the first block segment.

15. The memory controller of claim 10, wherein:

the hardware controller further is to logically partition the memory into a plurality of monolithic blocks, each monolithic block having a size $2^k$, whereby the portion of the memory comprises a first monolithic block of the memory; and the hardware controller is to logically partition the first monolithic block into the first set of block segments in response to receiving a data portion of the first data unit that is smaller than the size of the monolithic blocks.

16. The memory controller of claim 15, wherein, in response to identifying a data portion of a second data unit is smaller than the size of the monolithic blocks, the hardware controller is to logically partition a second monolithic block of the plurality of monolithic blocks into a second set of k block segments of different sizes such that a block segment i of the second set has a size $B^i$ for i=0 to k−1 and a second mapping information block being of a size equal to a smallest block segment, and wherein the hardware controller further is to map a first block segment of the second set to the second data unit and to modify a value stored at the second mapping information block to identify the first block segment of the second set as being mapped to a data unit.

17. The memory controller of claim 16, wherein:

the hardware controller further is to map a second block segment of the second set to the first data unit in response to identifying the second block segment as available for mapping to a data unit, and to modify the value stored at the second mapping information block to identify the second block segment of the second set as mapped to the first data unit; and the hardware controller is to identify the second block segment of the second set as available for mapping based on the value stored at the second mapping information block.

18. The memory controller of claim 10, wherein the hardware controller further is to map a second block segment of the first set to the first data unit and to modify the value stored at the first mapping information block to identify the second block segment as mapped to the first data unit.

19. The memory controller of claim 10, wherein, in response to identifying a select data portion of the first data unit having a size that is not equal to a size of any unmapped block segments of the first set, the hardware controller is to logically partition a second block segment of the first set having a size $2^j$ greater than the size of the select data portion into a second set of j block segments of different sizes such that a block segment i of the second set has a size $B^i$ for i=0 to j−1 and a second mapping information block containing information identifying locations of the j block segments, the second mapping information block being of a size equal to a smallest block segment, wherein the hardware controller further is to map a subset of block segments of the second set to the first data unit, the subset of block segments of the second set having a collective size equal to the size of the select data portion, and wherein the hardware controller is to modify a value stored at the first mapping information block to identify the second block segment of the first set as being mapped to a data unit and to modify a value stored at the second mapping information block to identify the subset of block segments of the second set as being mapped to a data unit.

20. The memory controller of claim 19, wherein, in response to erasing the select data portion from the subset of block segments of the second set, the hardware controller further is to logically combine the second set of block segments back into the second block segment responsive to determining each block segment of the second set is not mapped to a data unit.

* * * * *